US008099261B2

(12) United States Patent
Braunstein et al.

(10) Patent No.: US 8,099,261 B2
(45) Date of Patent: Jan. 17, 2012

(54) LOW-COST SOLID-STATE IDENTIFICATION DEVICE

(76) Inventors: Zachary L. Braunstein, San Marcos, CA (US); Frederick Y. Mah, San Diego, CA (US)

( * ) Notice: Subject to any disclaimer, the term of this patent is extended or adjusted under 35 U.S.C. 154(b) by 731 days.

(21) Appl. No.: 12/221,337

(22) Filed: Jul. 31, 2008

(65) Prior Publication Data

US 2009/0070076 A1 Mar. 12, 2009

Related U.S. Application Data

(60) Provisional application No. 60/993,230, filed on Sep. 10, 2007, provisional application No. 60/999,418, filed on Oct. 17, 2007.

(51) Int. Cl.
*G06F 17/50* (2006.01)
(52) U.S. Cl. .......................................................... 703/1
(58) Field of Classification Search ....................... 703/1
See application file for complete search history.

(56) References Cited

U.S. PATENT DOCUMENTS 5,535,320 A * 7/1996 Gay et al. ..................... 715/234
6,557,282 B1 * 5/2003 Cleaver .......................... 40/541
6,812,907 B1 * 11/2004 Gennetten et al. ............ 345/1.3
2003/0146891 A1 * 8/2003 Poliakine ........................ 345/87
2005/0156867 A1 * 7/2005 Edelbrock ...................... 345/102

* cited by examiner

*Primary Examiner* — Dwin M Craig

(57) ABSTRACT

The invention describes intelligent configurable apparatus used for identification and status indication for variety of applications: point-of-service locations; buildings/apartment complexes, residential homes; street signs; etc. Apparatus could be stand-alone or expandable plug-in modules interconnected via local area wired and wireless network into identification and status system. Apparatus could be DC powered, including solar. Apparatus has controller and sensors. Based on apparatus configuration and information obtained from sensors, controller performs variety of controls: illumination color/intensity/modulation; power consumption; communication with other controllers over LAN and/or INTERNET. Sensors could detect: presence of object; environmental parameters—temperature, light, sound; power consumption. Configuration parameters include: power consumption, brightness, ambient conditions, and schedule of operation. Power consumption allows apparatus operation based on safety and cost criteria. Apparatus also controls light function and intensity to meet set criteria. This leads to self-contained apparatus automatically driven by set criteria, including cost control.

10 Claims, 29 Drawing Sheets

LOW-COST SOLID-STATE IDENTIFICATION DEVICE

CROSS-REFERENCE TO RELATED APPLICATIONS

We claim the benefits of Provisional Application No. 60/993,230 filed on Sep. 10, 2007, title “Modular Solid-state point-of-service status light”, and Provisional Application No. 60/999,418 filed on Oct. 17, 2007, title “Low-cost solid-state point-of-service identification light”.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable

BACKGROUND OF THE INVENTION

There are a number of applications, which require illumination of a sign, symbol, art, etc.

Among a variety of applications, there are a number which utilize illumination technologies to:

1) Identify a point of service location, such as: equipment, device, group of devices, etc.

2) Signify or indicate the Status of a point of service at a location

3) Identify a structure, such as: building, apartment, etc.

4) Identify an aisle or a section within a store, etc.

Applications could include:

a) Point-of-service man-operated and/or self-checkout lanes at stores, etc.

b) Individual equipment, or a group of equipment at machine shops, etc.

c) Point-of-service locations at business, such as: banks, post offices, airports, etc.

d) Identification of numbers and/or names of: buildings, houses, apartments, street signs, etc.

The existing illumination methods are based on the utilization of:

1) 7-segment LED modules, and as a result—do lack the ability to illuminate symbols, other then numbers and capital letters 2) Inefficient fluorescent and/or incandescent light bulbs, etc.

In contrast, our application covers a “Low-cost Solid-state Identification Device”, which could be designed based on the following principals:

a) Utilization of high efficient, low-cost and energy efficient solid-state Light Sources b) Optimization of the surface, which must be illuminated, in order to reduce requirements on illumination energy c) Identification of areas, which are not easily accessible or visible by users, and as a result, could be left not illuminated, or partially illuminated d) Power cycling of solid-state Light Sources at specified power levels, which could significantly exceed the power level limitations for continuous operation e) Placement of Light Sources in close proximity to the selected surface f) Optimization of direction of Light, the area of travel, the surface finish, material, etc. surrounding the Light, with an objective to retain the Light within the designated area as much as possible, and achieve the objective by illumination of the smallest area needed g) Utilization of Light Control components, such as: optical, mechanical and electronic to maximize utilization of the Light source h) Modular design to effectively support a variety of applications, respective production and distribution. As needed, the “Solid-state Identification Device” could consist of stackable side-by-side modules, or a single module.

i) Low DC voltage control, which could be provided by standard power brick devices with addition of low voltage control logic circuitry j) Flexible packaging, which could conveniently incorporate “Solid-state Identification Device” into existing designs, which could include stackable Light pole products, etc.

k) Effective low-cost packaging options, which could include environmental-proof packaging, as needed for specific applications l) Self powered via installed solar panel, which during the day would collect solar energy and charge respective battery, and then, as needed, would use this energy to power, control and illuminate “Solid-state Identification Device”

m) Custom selectable optional features, such as: addition of name tags, symbols (USA flag, team logo, etc.), etc., which could be placed along the perimeter, and which could have dedicated cluster of Perimeter Lighting with desired color, etc.

n) Custom selectable optional features, such as: wireless remote control; real-time programmable actions to program Controller to turn the entire or section of a device ON/OFF/flash/etc.; motion sensor, which could be used by Controller to trigger a customer selectable control—ON/OFF/flash/etc.; audible buzzer, or a speaker with pre-programmed or recorded message(s); exterior light sensor, which could be used by Controller to turn ON illumination, as needed; etc.

o) Utilization of embedded Controller to effectively implement required Lighting effects, such as: Light cycling ON/OFF; beacon-type circular Light cycling at various frequencies and durations; optional features listed above, etc.

p) Low heat generation from solid state illumination devices, as compared to incandescent or fluorescent light sources, improves safety for users in regards to burns or fire hazard.

As a result of the design advantages of the “Solid-state Identification Device”, a business could significantly lower respective operating expenses. An example: for a typical application of 2-stack set of lane Light indicators at a self-checkout terminal of a grocery store, where two 40 W bulbs are used (80 W total), switching to “Solid-state Identification Device” design could lower the installation costs and maintenance, and in addition—significantly reduce total power to only 7 W or less, and extending continuous operating hours from months to years without service.

In addition, applications based on “Solid-state Identification Device” could benefit from:

a) Improvements in safety, by replacing hi-power AC wiring and devices with low-power DC wiring and devices b) Optimization in size and reduction in weight of respective components c) Improvement in aesthetics
d) Extended range of Light-effects features
e) Extended life of operation without maintenance
f) Variety of other add-on features, such as: remote control, ambient light sensor, etc.

BRIEF SUMMARY OF THE INVENTION

In summary, the "Solid-state Identification Device" key features:

a) Energy efficiency, with outstanding ratio of utilization of energy resources, such as generated by solid state devices, to achieve desired requirements in illumination of designated signs, symbols, etc.
b) Intrinsic safety by utilization of low voltage DC power
c) Modularity for convenient support of variety of packaging applications ranging in: size, shape, environmental-proof, functionality features, etc.
d) Expandability with convenient addition of multiple Modules, or group of Modules, to include illumination of a multiple number of signs and/or symbols, and other functions, as needed
e) Cost efficiency for new installations, and long-time operational hours requiring practically no maintenance
f) Extended range of Light effects by utilization of characteristics of solid-state Light Sources, such as: switching at power levels well above continuous on-state; hi-speed switching with no impact on longevity; higher drive power at lower ambient temperatures; etc.
g) Ease of integration of other useful features, such as: remote control; sensors to detect change in exterior lighting, which could be used by Controller to optimize illumination intensity; sensor to detect object motion, which could be used by Controller to either attract an expected visitor, or to alarm of intruder; real-time control of various illumination feature—intensity, flashing, perimeter lighting, etc.

In particular, proposed designs of Modular Identification Devices for applications, which include identification of buildings and sections within, offer the following features:

1) Expandable, as needed. Additional Secondary Identification Modules could be added, which could provide additional functions and/or features, as needed. These Secondary Identification Modules could have required: power and control electronics; Illumination Devices; support components, etc.—as required.
2) Re-configurable, as needed. An entire assembled Modular Identification Device could be easily upgraded, as needed. An assembled Modular Identification Device could be separated onto individual Identification Modules, which could be then re-configured, and re-assembled back to an upgraded Modular Identification Device, as needed. Re-configuration could include: replacing an entire Module with another one; replacing Front Panel on a given Module with another Front Panel with required Symbol(s) and/or number(s); etc.
3) Extended operation. A failed Module within Modular Identification Device, could be easily replaced with a new one. Since the Front Panel is replaceable, it is possible, for a specific application, such as identification of an apartment building and apartments within it, to keep as spares required number of: Main Identification Modules, Secondary Identification Modules, Front Plates with pre-screened numbers; etc.
4) Immediate availability. Variety of popular configurations of: Main Identification Devices; Secondary Identification Devices; Front Panels with numbers, etc.; mounting accessories; etc.—could be sold in stores as individual items, or in a form of a kit.
5) On-line availability. A custom configuration of: Main Identification Devices; Secondary Identification Devices; Front Panels with numbers, etc.; mounting accessories; etc.—could be ordered directly on-line, and delivered within a relatively short period of time as individual items, or in a form of a kit.

Proposed designs of single unit Identification Devices for applications, which include identification of buildings and sections within, offer the following features:

1) Low cost. For applications, such as a tract development of residential houses, a specific design and configuration of Identification Devices could be selected from a standard range of previously designed models (in terms of: size, features, etc.), and then delivered for installation. Most popular sizes and configurations (in terms of: features, etc.) of Identification Devices could be pre-assembled with a blank Front Panel or without Front Panel. Then, as requested, required numbers, symbols, etc.—could be placed or attached to the respective Front Panels, creating a unique Identification Device.
2) Uniformity. For some applications, a uniformed number of standard or custom designed Identification Devices could be easily made available, which could distinguish an application from others, as needed.
3) Immediate availability. Variety of popular configurations of a single unit Identification Device with a blank Front Panel could be sold in stores as individual items. In addition, popular self-adhesive type: symbols, numbers, etc. could be also sold in stores. Once purchased, these symbols could be then adhered to respective sections on the Front Panel, per provided instructions. In addition, various mounting kits for single unit Identification Device could be also sold in stores.
4) On-line availability. A custom configuration of an Identification Device(s), including selection of: size, colors, symbols, fonts, control options, security options, power options, mounting accessories; etc.—could be ordered directly on-line, and delivered within a relatively short period of time.

Illustrations of Identification Devices in this drawing could be used in a variety of applications, and could be most effective in identification of: buildings; sections within buildings; street signs; etc. For simplicity, single and dual "number-type" Identification Devices are shown, as examples. Proposed technology could be successfully applied to implementation of any combination of: signs, symbols, numbers, etc.

BRIEF DESCRIPTION

Drawing Content and Listing

Our application contains drawings listed in Table 1, below.

TABLE 1

| List of Drawings | |
|---|---|
| FIG. | Description |
| 1 | Dual number or symbols Illumination Module |
| 2 | Single number or symbol Illumination Main Module |
| 3 | Single number or symbol Illumination Secondary Module |
| 4 | Dual number or symbols Identification Device |
| 5 | Dual number or symbols Identification Device with optional components |
| 6 | 3-D view components - round-shape 4-side Identification Device |
| 7 | 3-D view of enclosure - round-shape 4-side Identification Device |
| 8 | 3-D view of assembly - round-shape 6-side Identification Device |
| 9 | 3-D view of construction details - round-shape 4-side Identification Device |
| 10 | 3-D view of sub-assembly details - round-shape 4-side Identification Device |
| 11 | 3-D view of assembly - round-shape 4-side Identification Device |
| 12 | 3-D view of construction details - rectangular 4-side Identification Device |
| 13 | 3-D view of assembly components - rectangular 4-side Identification Device |
| 14 | 3-D view of rectangular 4-side Identification Device |
| 15 | Side view of rectangular 4-side Identification Device |
| 16 | Top view of control PC-board assembly - rectangular 4-side Identification Device |
| 17 | Side view of control PC-board assembly - rectangular 4-side Identification Device |
| 18 | Bottom view of control PC-board assembly - rectangular 4-side Identification Device |
| 19 | Top view of PC-board - rectangular 4-side Identification Device |
| 20 | Side view of control PC-board sub-assembly - rectangular 4-side Identification Device |
| 21 | 3-D view of construction details - triangular 2-side Identification Device |
| 22 | 3-D view of assembly components - triangular 2-side Identification Device |
| 23 | 3-D view of triangular 2-side Identification Device with round base |
| 24 | Top view of control PC-board assembly - triangular 2-side Identification Device |
| 25 | Bottom view of control PC-board assembly - triangular 2-side Identification Device |
| 26 | Side view of control PC-board assembly - triangular 2-side Identification Device |
| 27 | 3-D view of triangular 2-side Identification Device with triangular base |
| 28 | 3-D view construction details - triangular 2-side Identification Device with triangular base |
| 29 | 3-D view - triangular 2-side Identification Device with triangular base |
| 30 | 3-D view - triangular 2-side Identification Device with a dedicated section for Status Identification, and a triangular base |
| 31 | 3-D view - triangular 2-side wall-mount Identification Device |
| 32 | 3-D view - triangular 2-side wall-mount Identification Device with a dedicated section for Status Identification |
| 33 | 3-D view of 1-side wall-mount Identification Device |
| 34 | 3-D view of 1-side wall-mount Identification Device with a dedicated section for Status Identification |
| 35 | In-series connection of Illumination Devices |
| 36 | Matrix connection of Illumination Devices |
| 37 | Single digit Main Identification Module |
| 38 | Mounting bracket for an Identification Module |
| 39 | 3-D view of a single digit Main Identification Module |
| 40 | 3-D clear-view of a single digit Main Identification Module |
| 41 | Front clear-view of a single digit Main Identification Module |
| 42 | Side clear-view of a single digit Main Identification Module |
| 43 | Top clear-view of a single digit Main Identification Module |
| 44 | 3-D view of a single digit Secondary Identification Module |
| 45 | 3-D clear-view of a single digit Secondary Identification Module |
| 46 | 3-D view of a assembly components - single digit Secondary Identification Module |
| 47 | Left side clear-view of a single digit Secondary Identification Module |
| 48 | Front clear-view of a single digit Secondary Identification Module |
| 49 | Right side clear-view of a single digit Secondary Identification Module |
| 50 | Front view of construction details - 2-digit Modular Identification Device |
| 51 | 3-D view of construction details - 2-digit Modular identification Device |
| 52 | Views of mounting details - 2-digit Modular Identification Device |
| 53 | Views of mounting components - 2-digit Modular Identification Device |
| 54 | 3-D view of mounted 2-digit Modular Identification Device |
| 55 | 3-D view of mounted 1-symbol Modular Identification Device |
| 56 | Views of mounting details - 3-digit Modular Identification Device |
| 57 | 3-D view of 3-digit mounted Modular Identification Device |
| 58 | 3-D view of mounting details - 3-digit Modular Identification Device |
| 59 | 3-D view of 2-digit Identification Device |
| 60 | Top view of round shape Controller Board with embedded Controller section, electrical interface for Identity Light four Light Modules and Perimeter Light Sources |
| 61 | 3D top view - round shape Controller Board with embedded Controller section, electrical interface for round-shaped Identity Light with four Light Modules and Perimeter Light Sources |
| 62 | Side view of round shape Light Controller PC board |
| 63 | Bottom view of round shape Controller Board with Perimeter Light Sources for Status Light |
| 64 | 3D bottom view of round shape Controller Board with Perimeter Light Sources for round-shaped Status Light |
| 65 | Top view of round shape Controller Board assembly with embedded Controller, four Light Modules and Perimeter Light Sources |

TABLE 1-continued

| List of Drawings | |
|---|---|
| FIG. | Description |
| 66 | Bottom view of round shape Controller Board assembly with embedded Controller, four Light Modules and Perimeter Light Sources |
| 67 | 3D top view of round shape Controller Board with embedded Controller section, electrical interface for round-shaped Identity Light with four Light Modules and inner Perimeter Light Sources on the back side |
| 68 | 3D bottom view of round shape Controller Board inner Perimeter Light Sources |
| 69 | Top view of rectangular shape Controller Board with embedded Controller section, electrical interface for rectangular-shaped Identity Light for four Light Modules and Perimeter Light Sources |
| 70 | Bottom view of rectangular shape Controller Board with Perimeter Light Sources for round shape Status Light |
| 71 | Top view of triangular shape Controller Board with embedded Controller section, electrical interface for two Light Modules and Perimeter Light Sources |
| 72 | Bottom view of triangular shape Controller Board with Perimeter Light Sources for round shape Status Light |
| 73 | Side view of assembled round-shaped Controller Board with embedded Controller section, four Light Modules and Perimeter Light Sources |
| 74 | 3-D view of assembled round-shaped Controller Board with embedded Controller section, four Light Modules and Perimeter Light Sources |
| 75 | 3-D view of a Combo Cover with its lower section shaped for Perimeter Lighting of a Status Light assembly |
| 76 | 3-D view of a low-cost Combo Cover with straight lower section |
| 77 | Side view of a low-cost round-shaped Cover Lid without Perimeter Adapter components |
| 78 | Side view of a round-shaped Combo Cover with Perimeter Adapter components |
| 79 | 3-D view of a low-cost round-shaped Cover Lid without Perimeter Adapter components |
| 80 | 3-D view of a round-shaped Combo Cover with Perimeter Adapter components |
| 81 | 3-D view of a construction detail - assembled round-shaped Controller Board with embedded Controller section, four Light Modules and Perimeter Light Sources, and round-shaped Combo Lid with Perimeter Adapter component |
| 82 | 3-D view of a construction detail - assembled rectangular-shaped Controller Board with embedded Controller section, four Light Modules and Perimeter Light Sources, and rectangular-shaped Cover Lid with Perimeter Adapter component |
| 83 | 3-D detailed view of a Mounting Pole with Support Flange and Switch Module |
| 84 | 3-D view of a Mounting Pole with round-shaped Support Flange with section designed in support of Perimeter Lighting of a Status Module, a Switch Module and a Communication Module |
| 85 | Front view of a power and control PC-board assembly, which could be used for a single unit Identification Device |
| 86 | Front view of a power and control PC-board assembly, with installed optional components: Solar Battery, sensors, etc., which could be used for a single unit Identification Device |
| 87 | Front view of a power and control PC-board assembly, which could be used for a Main Module of a Modular Identification Device |
| 88 | Front view of a power and control PC-board assembly, which could be used for a Secondary Module of a Modular Identification Device |
| 89 | Identification Device System |

DRAWING CONVENTION AND FORMAT

Drawings with this application, in addition to USPTO requirements, are:

a) Not to scale.

b) Referenced to "X-Y-Z" coordinate system, which is consistent throughout all Drawings c) For simplicity selected section or sections of drawings and/or figures are shown as "see-through", i.e. consisting of materials transparent to the viewer d) Arrows are used for pointing step-by-step assembly sequence of placing parts or sub-assemblies inside another part or sub-assembly e) Dashed lines are used for outlining a group of parts, sub-assemblies and assemblies, which could be identified by unique number as a sub-assembly or as an assembly

DEFINITIONS

Our application contains definitions of specific components or processes, which are scripted in "bold italic", and which are listed below. Definitions are used and expanded in greater details in later paragraphs, as needed.

Notes:

1. Throughout this application, all presented designs, as well as references to design methods, practices, etc.—are expected to comply with respective safety regulations and requirements.
2. Although the illumination process described is mainly based on utilization of visible Light, the design principals covered in our patent application could be successfully applied to other energy emission type technologies, existing or newly developed, which could be used to illuminate an object, or distinguish a selected object from a group of objects.

NOTE: This application has definitions, which share the same functionality with definitions listed in the previous provisional application. These common definitions, or synonyms, include:

Solid-state Identification Device=Low-cost Identification Device

Status Light=Status Module

Identity Light=Symbol Light=Identity Module=Symbol Module=Identification Device

Identification Module=Illumination Module=Identification Device

Light Controller=Controller=Embedded Controller=Device Controller

Light Control Board=Identification Control Board=Device Control Board

Combo Cover=Cover=Light Enclosure=Enclosure

Combo Module=Combo Light

Bottom Flange=Mounting Flange=Support Flange

Perimeter Lighting=Status Identification

Top Lid=Combo Lid

Beacon Effect=Beacon Lighting

Matrix Connection=LED Matrix=Solid-state Matrix

Front Panel=Illumination Panel

Backlighting

Could be defined, as a method of positioning illumination devices, such as solid state, behind a surface, which is required to be illuminated. Backlighting could be used for:

a) General Illumination of an entire or a selected section of a surface, which could include an in-printed Symbol or Symbols. An example: Backlighting of a rectangular section of a transparent flat surface, such as clear plastic, which could have in-printed or silk-screened in black color Symbols, such as—alpha-numeric characters, etc. As result, the Symbols could stand-out in black color, while the remaining area of the selected section cold be illuminated by solid state devices, such as white or light color LED's, to enhance the visibility of the black Symbols.

b) Symbol illumination, when respective illumination devices, such as solid state, could be mounted behind along the outline of a Symbol or selected Symbols in-printed on a colored surface, with Symbols outline signified by in-contrast in transparent or lighter color. An example: a transparent plastic surface, with sections painted in light color, while the outline of a Symbol or Symbols not painted, i.e. remained—transparent. Backlighting in a form of white or color LED's could be mounted along the outline of the Symbols, enhancing Symbol presence in contrast to the surrounding area.

c) Or combination of General and/or Symbol illumination of selected sections of a given surface with a number of Symbols in-printed, which via illumination parameters, such as: intensity, color, etc.—could further enhance, visibility of Symbols on a given surface.

Beacon Lighting

Could be defined, as a method of controlling solid-state Light Sources, by switching designated groups or Modules ON and then OFF, and as a result, creating an effect of sequential round Lighting effect, similar to what has been implement in beacon-type applications. Due to superior characteristics of solid-state Light Sources, the Controller could execute a variety of sequential round Lighting effects in one direction, or multi-direction.

Bottom Flange

Could be defined as a support component, which could be designed to fit over the Mounting Pole, and which could serve as a base support for Combo Cover with Combo Module inside of it. The Bottom Flange could be designed to water-seal the Combo Cover from the bottom.

Controller Board

Could be defined as a PC board, which could house such components, as: electronic Control devices—embedded controllers and support electronics; Light Sources, such as LED's; communication electronics for wired and/or wireless communications with a remote host computer, other Modules, etc.; sensors which could detect change in exterior lighting, and which could be used by Controller to optimize required illumination intensity; sensors which could detect ambient temperature, and which could be used by Controller to optimize amount of drive power of illumination components; sensors which could detect motion of an object, and which could be used by Controller for optional add-on security feature—to either acknowledge the event, or sound an alarm of an intruder; driver electronics which could be used to power electronics and other devices, as needed; sensor, which could be used for remote control; interface connectors; etc. The Controller Board could be designed, including parameters such as its: size, thickness, shape, etc. to meet requirements of a specific application. Controller Board could be designed to support Light Sources for Perimeter Lighting of round and/or rectangular shaped Status Light. Controller Board could be designed, so that both sides of it could be populated with required components. Controller Board could be designed to support Perimeter Adapters, and other components, as needed. Controller Board could be powered by various methods, which could include power sources with respective DC power specifications (voltage, current, ripple, temperature range, etc.): AC-DC power converters; solar energy collection technology based DC power source; batteries, etc. Controller Board could be designed to interface to remote devices, such as: remote Controller via LAN; other devices, such as activation relays via direct wiring interfaces; etc. with an objective to provide required level of control for a specific application. Controller Board could be designed to support Perimeter Adapters, and other components, as needed. Controller Board could be design, as needed, to provide required functions for an Identification Device.

Combo Board

Could be defined as a Controller Board, which could be designed to be populated by components on both sides: top and bottom. Depending on application, each side of the Combo Board could be populated by specific components. In a typical application, with an Identity Module on top and a Status Module at the bottom, a Combo Board could be designed for mounting on the:

a) Top side—such components, as: electronic Control devices, including embedded micro-Controller; communication electronics for interfacing to remote Controller or computer; driver electronics for providing power to Light Sources; interface electronics for Light Modules; Light Sources, which could be used for providing Perimeter Lighting of the Identity Module; interface connectors for Light Modules; etc.

b) Bottom side—such components, as: driver electronics for providing power to Light Sources; Light Sources, which could be used for providing Perimeter Lighting of the Status Module; interface connector(s) for power and communications interface to remote Controller and/or computer.

Combo Module

Could be defined as a version of a Low-cost Solid-state Point-of-service Light, which could consist of one Identity Light and one Status Light. In a typical Combo Module, the Identity Light could be designed to include several Light Modules for illumination of a Point-of-service identification symbol(s), while the Status Light could be designed to represent the Status of the Point-of-service. In these applications, the Control of the Identity Light could include Control of Light Modules: Light ON; Light OFF; Light blinking at specified frequency and at 50% duty cycle, with illumination intensity significantly higher compared to ON state. In addition, Perimeter Lighting, as needed, could be controlled separately, and could utilize color Light Sources, as needed.

Control of the Status Light could include: Light ON; Light OFF; Light blinking at specified frequency and at 50% duty cycle, with illumination intensity significantly higher compared to ON state; Perimeter Lighting, which could utilize color Light Sources, as needed.

Combo Cover

Could be defined as a common Cover, which could be designed to enclose a Combo Module. Low-cost version of a Combo Cover could enclose a Combo Module from the sides, while additional components could enclose the top and bottom of a Combo Module. Combo Cover color could be selected, as needed. Combo Cover outer surface could be silk-screened with required symbols (alpha, numeric, art, etc.), as required for a specific application. Combo Cover designated sections could be painted or colored, as needed.

Combo Lid

Could be defined as a component, which could be designed to match the upper section of a Combo Cover, and when installed, could seal from the top the Combo Module inside the Combo Cover. Combo Lid could be designed to incorporate a Perimeter Adapter or Adapters, with an objective to create a designated area within an Identification Light assembly, which could be used for Perimeter Lighting.

Communication Interface

Could be defined as serial communications between Light Controller and variety of devices, such as: remote computer, remote Controller, remote Module, etc. Communication Interface could be implemented based on standard communication platforms, such as: RS232, USB, wireless technologies, etc. Communication Interface could be designed to support multi-drop LAN, which could allow connection of several Light Controllers via LAN to remote computer, or Controller.

Communication Module

Could be defined as support components, such as: interface connector or connections, which could be designed to provide convenient interface between Light Controller installed on top of a Mounting Pole and a computer or other Controller, and could support standard interface connections for hi-speed serial interfaces, such as: RS232, USB, wireless, etc. Communication Module could be installed in a Mounting Pole, as needed.

Control Function

Could be defined as a function, which could be executed by a local Controller of an Identification Device upon: direct request by an user via wireless remote control device; condition when a specific Trigger Point of a Sensor has been reached; request by a remote Controller over LAN. Control Function could include: tuning ON/OFF devices, such as: Illumination Devices, audio, etc.

Designated Area

Could be defined as an area which could be selected for illumination by Illumination Devices. Designated Area could be a section or sections selected on the Front Panel. Light Retainer and Light Control components could be used to direct illumination from Illumination Devices toward Designated Area(s) as needed. Designated Area could be used to illuminate required Symbol(s).

Direct Lighting

Could be defined as a method or a principal of installing Light Sources along the perimeter of the Light Controller PC-board, and being mounted at a right angle, which could allow direct illumination from these lights toward the edge of the Light Controller PC-board. This method could be conveniently used for Direct Light illumination of a designated section of a uniformed Combo Cover, assigned for indicating Status state of a Low-cost Point-of-service Identification Light. Light Sources, which could be placed on the bottom side of Light Controller PC board assembly, could be mounted along the perimeter of the Light Controller PC board assembly, and arranged in an alternate mounting scheme of combination of vertical and right side mount, which could create combination of Perimeter and Direct Lighting, as needed. For Direct Lighting standard vertically stacked right-angle mount LED assemblies could be placed along the perimeter of Light Controller PC board. A separate PC-board could be dedicated for Perimeter Lighting only, and plugged into Light Controller PC board for control and power interface.

Dual Function

Could be defined, as method of combining Identity Light and Status Light functions in one Dual Function Identification Light with a Light Controller with Light Sources installed on top side only. Dual Function could be implemented within one Cover by using an Identity Light Module with an installed number of Illumination Modules, and then using installed Perimeter Lighting to function as a Status Light. Illumination Modules could be of one color, while the Perimeter Lighting could be multi-color, as needed. Dual Function could also be implemented within one Cover by using an Identity Light Module with an installed number of Illumination Modules, and then apply controls, such as: cycle ON/OFF selected number or all Illumination Modules at various frequencies, and higher illumination power; execute Beacon Effect in a selected direction; etc.—to represent Point-of-service Status state.

Identification System

Could be defined as System, which could consist of a number of Identification Devices, Modules, and other control and support components, as needed. Devices and/or Modules within a System could be interfaced via designated and/or industry standard technologies, such as wired or wireless LAN. A System, which could be controlled by a host computer over LAN, could be used for identification purposes, which could include: identification, warning, emergency, etc.

Interface Wiring

Could be defined as Wiring, which could be required for providing specified signals, such as: power, communications, control, Switch Module control, etc. between an Identification Light assembly and other devices, such as: computer, operator terminal, etc. Interface Wiring could be designed to reside inside the Mounting Pole.

Illumination Control

Could be defined as a Light Control, as it reflects on Illumination Parameters of a specific area or a surface. All available Light Control features could be used by Controller to achieve desired Lighting effects for any given application.

Illumination Parameters

Could be defined as a variety of Light Control parameters, which could be applied toward illumination of a designated area or surface, which could be selected by Controller, as needed. Illumination Parameters could include: illumination ON/OFF control; illumination intensity; illumination color; illumination cycling ON/OFF at selected frequency with respective selection of ON-cycle and OFF-cycle; illumination sequence; etc. Selection of Illumination Parameters and their control for each given application, could be based on the type of illumination devices chosen to ensure their performance within specification parameters.

Illuminated Pole

Could be defined as a section of a Mounting Pole, the exterior of which could be designed to serve as one of the inner surfaces for enclosing a designated area within a Status Module for implementation of Perimeter Lighting inside a Status Module.

Illumination Device

Could be defined as a solid-state device which could be used by Controller alone, or in combination with other Illumination Devices to illuminate Designated Area(s) as needed. Illumination Device(s) could be used to provide; illumination of Symbol(s), Perimeter Lighting, etc. Illumination Devices could be: of different colors as needed, in standard or custom packaging as required for specific application.

Illumination Panel

Could be defined as a panel which could be placed in front of Illumination Device(s), and which could have Symbol(s) placed on any side, and which could be illuminated by Illumination Device(s) as needed. Also could be referred to as Front Panel. Illumination Panel could have Designated Area (s) which could be illuminated as needed. Illumination Panel could be a stationary/permanent or replaceable component of an Identification Device.

Instruction Set

Could be defined as a number of Commands, which could be executed by Controller. Commands could be send by a host computer over Communication Interface, or entered manually by an operator via dedicated program running on a remote computer or Controller. Instruction Set could be defined as a set of grouped functional Commands, which could include the following groups: Mode, Run, Status, etc. Mode Commands could include such instructions as: Program; Manual; Auto. Program Mode could include instructions, which could allow configuration of a Light Controller for any specific application. Status Commands could include instructions of verifying state and/or status of a Light Controller. Run Commands could be selected from a wide variety of available Commands for any specific design and application, with an objective to achieve the most effective Controls. For each specific application, or installation, Instruction Set could be selected or pre-defined, and each Command could be as simple as a single unique (Command-specific) ASCII character, which could be echoed back by Light Controller to the source (operator, computer or Controller) to acknowledge that respective Command was received and executed.

An example of Run Commands for the triangular Low-cost Combo Identification Light, consisting of one Dual Function Identify Light and one dual-color Status Light, is listed in Table 2 below. For illustration purposes, a single Command-specific alpha-character was selected to represent respective instruction.

TABLE 2

Run Commands

| Command | Function |
|---|---|
| A | Identity Light ON |
| a | Identity Light OFF |
| B | Identity Light cycle @ .5 sec (50/50 duty) |
| C | Identity Light cycle @ 1 sec (50/50 duty) |
| D | Identity Light cycle @ 2 sec (50/50 duty) |
| E | Status Light ON |
| e | Status Light OFF |
| F | Status Light GREEN ON |
| f | Status Light GREEN OFF |
| G | Status Light GREEN cycle @ .5 sec (50/50 duty) |
| H | Status Light GREEN cycle @ 1 sec (50/50 duty) |
| I | Status Light GREEN cycle @ 2 sec (50/50 duty) |
| K | Status Light RED ON |
| k | Status Light RED OFF |
| L | Status Light RED cycle @ .5 sec (50/50 duty) |
| N | Status Light RED cycle @ 1 sec (50/50 duty) |
| O | Status Light RED cycle @ 2 sec (50/50 duty) |
| P | Status Light GREEN Power High |
| R | Status Light RED Power High |

Light Control

Could be defined as electronic Control of Light Parameters of an individual solid-state Light Source, or a group of solid-state Light Sources. Due to superior characteristics of solid-state Light Sources, the Controller could execute an extensive range of Light effects, as needed for a specific application. The Lighting effects could be one or combination of any of the following Controls applied to individual solid-state Light Source or a designated group of Light Sources:

a) Cycling ON/OFF with stable or variable—ON-time, OFF-time, cycling frequency
b) Dynamically changing drive power, which could be accomplished by changing either voltage, or current, or both, which could increase illumination intensity
c) Applying Controls listed in (a) dynamically to a group of Lights in one direction, or changing directions
d) Dynamically changing selected group of Lights in terms of their location and number of Lights within a group Light Controller Could be defined as a number of electronic components, which could include embedded Controllers, which could reside on the same PC board as the Light Sources, such as LED's, and which could execute required Control functions requested by operator or remote host computer. Light Controller, which could be based on standard embedded micro-Controller, or an ASIC, could be employed together with required peripheral support components, to execute a variety of Controls, which could take advantage of a wide-range of characteristic features of solid-state Light Sources. As needed, the embedded micro-Controller could have a built-in temperature sensor, which could be used by Controller embedded software for monitoring ambient temperature surrounding micro-Controller. Since operating temperature of micro-Controller could be significantly higher than the required or selected maximum operating temperature of Light Sources within the Identification Light assembly, the micro-Controller temperature data could be used by Light Controller to ensure safe operation and Control of respective Light Sources. For each specific application, a limit of maximum operating temperature inside Identification Light assembly could be selected. In the event, the micro-Controller temperature reached that maximum limit, Controller software could execute one or combination of the following:

a) Turn OFF all Light Sources
b) Turn OFF selected Light Sources
c) Lower applied drive power to Light Sources
d) Execute a "warning-type" state, which could be pre-defined, and could include a specific Light effect, etc.
e) Inform operator or computer via serial communication message of the fact the temperature reaching the set limit Light Controller could be designed to support required Communication Interfaces, with such features as:

a) Remote configuration of available Light Control features, including selection of specific Light effects to represent a specific state of Point-of-service location
b) Remote configuration of available Light Control features, including selection of specific Light effects to represent a specific "warning" state of Light Identification assembly, which could include: temperature limit; failure of one of parameters monitored by self-diagnostics of Controller software c) Periodic or on-request reporting of Light Controller state and/or Status, which could include: current temperature data; state of selected group of Light Sources, etc.

Light Diffuser

Could be defined as an optical component which when placed in-front of discrete Illumination Devices could blend their combined illumination, and could reduce or eliminate appearance of bright spots on the surface being illuminated by these Illumination Devices.

Light Parameters

Could be defined as a variety of Control parameters applied toward solid-state Light Sources, and which could be selected by Controller, as needed. Light Parameters could include: Light ON, Light OFF, Light intensity, Light color, Light cycling ON/OFF at selected frequency with respective selection of ON-cycle and OFF-cycle.

Light Retainer

Could be defined as an optical component which could be placed in-front of Illumination Devices, and which could serve to direct and/or retain as much illumination toward a designated area, as possible.

Main Module

Could be defined as a Module, which could contain Control Board, and which could control: via feed-through connections of a number of plug-in side-by-side Secondary Modules; via wireless interface remotely located Secondary Modules; etc. A modular design could support a daisy-chain Module-to-Module interface, which could allow to pass required signals from the Main Module to each Secondary Module, as needed. An example of a modular design for a 5-digit house number: one Main Module, which could contain all required control electronics and Illumination Devices of the first digit from the right end, and then side-by-side plugged-in Secondary Modules, each with Illumination Devices of a respective digit. Main Module Controller via wireless technologies could trigger required functions on Secondary Modules. An example: an emergency state detected by the Main Module could be signaled to indicate this condition on all or selected Secondary Modules, as needed.

Matrix Connection

Could be defined as a method of electrical interconnection of discrete Solid-state Illumination Devices, such as LED's, which could provide:

a) Highly efficient utilization of electrical power b) Least dependency of Illumination Intensity and illumination distribution from a single or multiple failures of a discrete device.

An example: a matrix of 12 LED's arranged as 3 columns by 4 rows; LED's in each column could be connected in-series, and then each LED in each row, could be connected in-parallel. As result, if any or a number of LED's has failed, remaining LED's could be still operational, for as long there is a continuous pass of electrical current from one end of the power source through LED's to the opposite end of the power source.

For power sources, such as a regulated voltage, efficiency could be achieved by placing as many LED's in each column in-series as possible, for as long as the collective or cumulative voltage drop across all LED's in a column does not exceed the required minimum voltage to sustain regulation.

For power sources, used as a constant or regulated current, efficiency could be achieved by placing as many LED's in each column in-series as possible, for as long as the collective or cumulative voltage drop across all LED's in a column does not exceed the required supply voltage minimum level in order to sustain regulated current value.

Perimeter Adapter

Could be defined as a component or combination of components, which could be designed to be placed inside respective Module or assembly, and which could assist in creation of a designated area, which could be used for Perimeter Lighting. Perimeter Adapter(s) could be designed to be attached to the Top Lid of the Identity Module, so that when the Top Lid is installed, the Perimeter Adapter(s) are inserted inside the Identity Module in-between the Light Modules, those isolating the inner area of the Identity Module from being illuminated by Perimeter Light Sources. In applications requiring a higher brightness and a more uniformed Perimeter Lighting, a Perimeter Adapter or Adapters could be used as a support for flexible type PC-boards, which could have additional solid-state Light Sources installed, and which could be controlled, as needed, by the Controller installed at the Light Controller PCB assembly. The flexible PC-boards could be connected to respective interface connectors on the Light Controller PCB, and could be controlled either by the same circuit as the Perimeter Light Sources installed on the Light Controller PCB, or have separate circuit. The Perimeter Light Sources installed on flexible PC boards could be mounted, in relation to the surface of the board, either face-up to provide Direct Lighting, i.e. more light toward the outer perimeter surface of the Light Enclosure, or right angle—to provide more light along the outer perimeter surface of the Light Enclosure, just as the Perimeter Light Sources installed on the Light Controller board.

Perimeter Lighting

Could be defined as a method or a principal of installing Light Sources along inner side Perimeter of an object, and then creating Tunnel Lighting with an objective to illuminate a narrow section of the object, which could maximize utilization of the Light Source. Perimeter Lighting could be used for illuminating designated inner surfaces of an Identity Module. Perimeter Lighting could be used for illuminating designated inner surfaces of a Status Module. Perimeter Lighting for an Identity Module could be selected of specific color, as needed. For example, for a Point-of-service locations designated for handicap individuals, an industry standard blue color could be selected. In addition, an industry standard symbol(s) could be silk-screened on the outer surface of the Identity Light Cover, which could be illuminated by respective blue-color Perimeter Lighting of the Identity Module. Perimeter Lighting could be applied for illumination of designated surfaces within a Light Enclosure. As needed, standard or custom-designed light guiding components, such as light pipes, could be used for enhancing illumination of designated areas by selected Light Sources. Perimeter Lighting could be designed to illuminate designated symbols within an Identification Device, an example of which could be: name tag, and/or a flag, and/or a team logo—at designated locations, which could be selected along the perimeter, at corners, etc.—on a house Identification Device; symbols, such as: handicap sign on a Lane Light at the grocery store; etc.

Perimeter Light

Could be defined as a Light source, such as a solid-state LED, which could be mounted or arranged along the inner Perimeter of a base of an object. There could be several groups of Perimeter Lights, grouped in terms of their parameters, such: intensity, color, location, etc. installed inside a Status Light in a pattern, with an objective to utilize the emitted Light toward illumination of a designated surfaces with one or combination of illumination affects, which could differ in terms of: Light intensity, Light uniformity, Light color, etc. Perimeter Lighting could include combination of Light Sources shining toward a designated area or surface and Light Sources shining along a designated area or a surface.

Perimeter Group

Could be defined as a selected number of solid-state Light Sources, which could be positioned in a such arrangement as to provide the most effective and efficient utilization of Light Sources toward providing required Perimeter Lighting. The solid-state Light Sources within a Perimeter Group could be controlled identically, via common Control, or further separated and controlled in smaller groups, as needed.

Point-of-Service

Could be defined as location, where a specific service, or a number of services could be provided to a Customer. It could also include self-service locations. Examples could include:

a) Check-out lanes at Grocery stores, supermarkets, retail stores, etc.;

b) Ticket office locations at Airports, Theatres, etc.

c) Self-service to identify location of specific item or group of items at: grocery stores, retail stores, etc.

Secondary Module

Could be defined as a Module, which could contain required components, such as: Illumination Devices, driver electronics, interface electronics, interface connectors, etc., and which could be connected either directly or wirelessly, and controlled by a Main Module, and could be used to illuminate respective symbol(s), and execute other functions, as needed Sensor Could be defined as a Sensor which could detect any number of environmental or ambient conditions. The sensor could be located inside of a main module or secondary module. These could include motion, light, sound, light through a camera (visible/infrared), etc. . . . As an example, a sensor in the module could detect motion, and as instructed, could activate either directly via dedicated electronic components, or via controller, a Control Function, which could include: illumination of the modules, etc. In addition, it could activate other built-in devices of the main module, which could include: video camera for security purposes, pre-recorded sounds over a microphone, etc. Each Sensor could have sensor-specific Trigger Points or set levels, which could be set or programmed by an user, and which could be stored in a non-volatile memory of Controller. Controller in real-time could monitor Sensors, and detect condition when a respective Trigger Point has been reached. Controller could execute a Control Function, as programmed or set by an user, when a specific Trigger Point or combination of Trigger Points has been detected.

Solar Battery

Could be defined as an industry standard or available Solar Battery technology, which could be incorporated into Identification Devices, and could serve as a main power source, or in combination with other power sources—to provide electrical power to the identification device, as needed. This could significantly improve energy efficiency of Identification Devices, in particular the ones that are installed outdoors, with a sufficient exposure to ambient light sources, such as sun, etc.

Symbol

Could be defined as any single or combination of: alpha character, numeric character, art, etc. Could be placed on Front Panel, Top Cover, etc. by means of such processes as silk-screening, printing, painting, etc.

Symbol Module

Could be defined as a Module or Identification Device, which could be designed to illuminate a Symbol, or a number of Symbols, such as any or combination of: alpha character, numeric character, art, etc. Symbol Module could be used for illumination and identification purposes for a variety of applications, including: point-of-service locations; housings, buildings, departments within a building; sections within a store; etc.

Status Module

Could be defined as a Module designed to illuminate a stand-alone assembly, or a designated section within Identification Light assembly, to signify Status of point-of-service location, which could include one or combination of Status states, such as: open, closed, in-service, attention required, etc. Status Module could also be used to illuminate a symbol, such as any or combination of: alpha character, numeric character, art, etc. Status Module could use one or combination of colored Light Sources, such as LED's. Color or combination of colors could be selected per requirements of a specific application.

Switch Module

Could be defined as a support component, which could be designed as an optional add-on section to the Mounting Pole, and could provide manual Control of the Identification Module. Depending on application, a Switch Module could consist of one or more Switches. In addition, as needed, several Switch Modules could be installed along a Mounting Pole, or at a remote location. Switch Module functions could vary, depending on application, and could include one or combination of:

a) Turning power OFF to all electronics of the Identification Light b) Turning power OFF to specific Module within Identification Light c) Executing manually a specific Control function, in place of a remote Controller or computer d) Selecting a specific mode of operation for Controller Trigger Points Could be defined as an user set or pre-programmed level or value associated with a specific Sensor, which could be detected by Controller. Trigger Points could be stored in a non-volatile memory of Controller. Controller in real-time could monitor Sensors, and detect condition when a respective Trigger Point has been reached. Controller could execute a Control Function, as programmed or set by an user, when a specific Trigger Point or combination of Trigger Points has been detected.

Tunnel Lighting

Could be defined as a method or principal of passing the Light along a narrow Designated Area, or a Tunnel, which could be constructed as needed within a Status Light. The narrow Designated Area selected for illumination, could be restricted by Tunnel Surfaces, which could be designed to preserve the Light within the Tunnel as much as possible. The inner Tunnel Surfaces facing the Light could be designed to retain the Light in-between them as much as possible.

Tunnel Surface

Could be defined as a surface or surfaces, in-between which the Light could travel. These Tunnel Surfaces could be designed, so that their parameters, such as: shape, material, etc. Tunnel Surfaces could maximize utilization of the Light, including: Light retention; Light direction toward illumination of inner Surfaces of the Tunnel, etc.

DETAILED DESCRIPTION OF THE INVENTION

FIG. 1 through FIG. 5 illustrates design principals of various Illumination Modules, Identification Modules, Identification Devices, and respective components, which could be incorporated into design. Each component's parameter, such as: material, size, shape, location, etc. could be designed and/or selected to achieve, among other things:

a) The most efficient utilization of energy resources in providing required Illumination of a Designated Area
b) The most effective packaging for achieving required ergonomics
c) Required levels of safety and longevity with minimum maintenance required Shown components are for illustration of design principals, and could be changed as required.

FIG. 1. Illustrates an example of a dual number Illumination Module.

Figure elements are labeled as follows:

1—Front Plate component with a Designated Area (18) and a Numeric Sign (19), which could be attached to Illumination Module. The Front Plate when installed, could be used for attaching the respective Illumination Module to a Designated Area.

2—Light Retaining component, which could be attached via mounting holes (8) of the Illumination Board assembly (4). For applications where Front Plates are not used, the Light Retaining component could be used for mounting the respective Illumination Module to a Designated Area.

3—Light Correction component, which could be attached via mounting slots (9) of the Illumination Board assembly (4).

4—Illumination Board assembly, which could be designed based on PC-board, and which could be used to install: Illumination Devices, such as LED's shown in this example; power and control electronics; interface components; etc.

5—Solid-state Illumination Device shown in a form of an LED. The respective parameters of Illumination Devices, LED's in this example, such as:

a) Illumination properties (intensity, viewing angle, power dissipation, etc.)
b) Number of and location of each Illumination Device on the Illumination Board, etc.

could be selected to achieve the most optimum and cost-effective performance.

6—Input Interface connector, which could be used to provide power, control and communications signals to Illumination Board (4). Location of the Input Interface connector could be selected to achieve the most optimum packaging objectives

7—Output Interface connector, which could be used to provide power, control and communications signals to another Illumination Board. Location of the Output Interface connector could be selected to achieve the most optimum packaging objectives

10—Mounting hole on Light Retaining component (2), which could be used for attaching to Illumination Board (4)

11—Mounting hole on Light Retaining component (2), which could be used for attaching to Front Plate (1)

12—Section of Light Retaining component (2), which could be designed to match with Designated Area (19) of Front Plate (1)

13—Mounting hole on Front Plate (1), which could be used for attaching Light Retaining component (3)

14—Post of the Light Correction component (3), which could be used for mounting to Illumination Board (4)

15—Area or section of the Illumination Board (4), which could be used for placing optional components, such as: electronic integrated circuits, discrete electronic components, sensors, etc., which could be used for implementing required functions, such as: Illumination control, communications interface, safety protection, self-diagnostics, etc.

16—Inner surface of the Light Retaining component (2), and its parameters, such as: material, shape, etc. could be designed and/or selected to achieve most optimum retention and direction of light toward a Designated Area

18—Outline of a Designated Area with a Numeric Sign (19). Parameters of the Designated Area, such as: material, size, shape, etc. could be designed and/or selected to achieve the most efficient and effective implementation of requirements of a specific application. The sign within the Designated Area could be selected, as required by a specific application FIG. 2. Illustrates an example of a single number Identification Main Module, which could be used as stand alone, or in combination with Secondary Modules to function as an Identification Device Figure elements are labeled as follows:

316—Illumination Board assembly, which could be designed based on PC-board, and which could be used to install: Illumination Devices, such as LED's shown in this example; power and control electronics; interface components; etc. In the shown example, power and control electronics could be mounted on the back side of the PC-board.

317—Connector, which could be used for interface and installation of Secondary Illumination Modules

318—Area of Illumination Board assembly, which could be used for power and control electronics, and/or installation of optional components: light sensor, remote control sensor, motion detector, Status Identification LED's, etc.

319—Area of Illumination Board assembly, which could be used for power and control electronics, and/or installation of optional components: Solar Batteries, etc.

Remaining elements are labeled same as on FIG. 1.

FIG. 3. Illustrates an example of a single number Identification Secondary Module, which could be used in conjunction with a Main Module, or as a part of a modular Identification Device.

Figure elements are labeled as follows:

320—Illumination Board assembly, which could be designed based on PC-board, and which could be used to install: Illumination Devices, such as LED's shown in this example; power and control electronics; interface components; etc.

321—Area of Illumination Board assembly, which could be used for power and control electronics, and/or installation of optional components: Solar Batteries, etc.

322—Connector, which could be used for interface and installation to Main Illumination Modules

323—Connector, which could be used for interface and installation of other Secondary Illumination Modules

324—Area of Illumination Board assembly, which could be used for power and control electronics, and/or installation of optional components: Status Identification LED's, etc.

Remaining elements are labeled same as on FIG. 1.

FIG. 4. Illustrates an example of a dual number Identification Device, which could be configured for a variety of applications, including: identification of buildings, sections within a building, etc. For simplicity, Light Correction component is not shown, or could be incorporated into the Front Plate, as needed.

Figure elements are labeled as follows:

325—Front Plate component with a Designated Areas (329) and (330), which could be illuminated, as needed

326—Light Retaining component, which could be designed to match respective Designated Areas (329) and (330), and attached via mounting holes to the Illumination Board assembly (331).

327—Section of Light Retaining component, which could be designed to match respective Designated Areas (329)

328—Section of Light Retaining component, which could be designed to match respective Designated Areas (330)

331—Illumination Board assembly, which could be designed based on PC-board, and which could be used to install: Illumination Devices, such as LED's shown in this example; power and control electronics; interface components; sensors; etc.

332—Group of solid-state Illumination Device shown in a form of an LED, which could be used to illuminate Designated Section (329). The respective parameters of Illumination Devices, LED's in this example, such as:

a) Illumination properties (intensity, viewing angle, power dissipation, etc.)

b) Number of and location of each Illumination Device on the Illumination Board, etc.

could be selected to achieve the most optimum and cost-effective performance.

333—Group of solid-state Illumination Device shown in a form of an LED, which could be used to illuminate Designated Section (330). The respective parameters of Illumination Devices, LED's in this example, such as:

a) Illumination properties (intensity, viewing angle, power dissipation, etc.)

b) Number of and location of each Illumination Device on the Illumination Board, etc.

could be selected to achieve the most optimum and cost-effective performance.

334—Area of Illumination Board assembly, which could be used for power and control electronics, and/or installation of optional components: Status Identification LED's, sensors, speakers, etc.

335—Area of Illumination Board assembly, which could be used for power and control electronics, and/or installation of optional components: Solar Batteries, sensors, etc.

336—Area of Illumination Board assembly, which could be used for power and control electronics, and installation of optional components, as needed

337—Area of Illumination Board assembly, which could be used for optional: diagnostics LED's, perimeter lighting LED's, etc. As shown in this example, installed LED's could be used for Status Identification

338—Area of Illumination Board assembly, which could be used for optional: diagnostics LED's; perimeter lighting LED's for illumination of name-tags and/or symbols; etc.

FIG. 5. Illustrates an example of a dual number Identification Device shown on FIG. 4, with an installed Solar Battery (342) and Perimeter Lighting (343). The Solar Battery during the day-time could collect and store energy, and in the evening, or as needed, could either power directly or indirectly together with another source, provide required power to illuminate Identification Device, and power respective control and power electronics.

Remaining elements are labeled same as on FIG. 4.

FIG. 6 through FIG. 11 illustrates round-shape 4-side Identification Device with a Combo Cover, consisting of Identity Light with optional multi-color Perimeter Lighting inside, and Status Light with multi-color Perimeter Lighting inside. FIG. 6 through FIG. 11 illustrates a variety of configurations of a round shape Point-of-service Identification Light with utilization of: stackable Status Identification Modules on top or bottom; Perimeter Lighting method; etc. in order to achieve the most effective utilization of Light Sources. This design could be used in a variety of applications, including identification of Point-of-service locations, etc.

FIG. 6. Illustrates some of the major components and sub-assemblies of a round-shape 4-side Identification Device sub-assembly. Also shown—a Top Lid (125) without Perimeter Adapters. This design could provide diffused Perimeter Lighting of an Identity Module, as required for specific applications.

Figure elements are labeled as follows:

106—Illumination or Light Module, which could be used for illuminating respective symbol of a round-shaped Identification Module. As shown, up to four Light Modules could be installed, as needed. The shape of the Light Module assembly could be designed to match the interior shape of a selected Combo Cover, such as the one shown on FIG. 7 (128), to minimize leakage of light to the sides of the Light Module.

126—Round-shape Controller Board assembly with functional and mechanical support for: four Identity Light Modules (106); two-color Perimeter Lighting of Identity Module (127); two-color Perimeter Lighting of a Status Module, for which respective Illumination Devices could be mounted on the back side of the Controller Board (not shown for simplicity), and which could illuminate the lower section (150) of the Combo Cover (128), shown on FIG. 7

127—Illumination Devices, which could be designed to include groups of two color LED's, and which could be used for Perimeter Lighting of the Identification Light, and could be used for Status Identification, as needed FIG. 7. Illustrates deign of a Combo Cover (128) with lower section shaped for Perimeter Lighting of Status Module, which could be used to enclose the Identification Light sub-assembly shown on FIG. 1.

Figure elements are labeled as follows:

129—One of four 2-digit numbers, as shown "23", which could be silk-screened along the perimeter of the Combo Cover (128) at designated locations

130—Section of the Combo Cover (128), which could be designated for retaining Perimeter Lighting, which could be provided by respective Illumination Devices, which could be mounted on the back side of the Controller Board, such as the one illustrated on FIG. 6, which could be installed inside the Combo Cover (128)

149—Side surface of the round-shape Combo Cover (128), which could be designed to achieve most effective utilization of the Illumination Devices to be placed within

150—Lower section of the round-shape Combo Cover (128), which could be used for Status Identification FIG. 8 Illustrates design details of a two-stack round shape 6-side Identification Device (33), which could include a Status Identification Module (34) on top, and the entire assembly could be attached to a Mounting Pole (35). For simplicity, components within the Identification Device (33) are shown as transparent. Also, along the perimeter of the round-shaped Status Light (33), as many as six Illumination Modules could be installed. In the example shown—total of six Illumination Modules are mounted inside the Status Light (33), taking advantage of the round-shaped design. As with all designs, utilization of available illumination sources is focused strictly on illumination of a specific Designated Areas.

Figure elements are labeled as follows:

36—One of openings in the Mounting Pole (35), which could be used for feeding wires into Status Light assembly (33). Similarly, another opening or openings (not shown) in the Mounting Pole section within Status Light (34) could be used for feeding wires into Status Light assembly (34), as needed.

51—One of Illumination Module assemblies mounted inside the Status Light (33)

FIG. 9 Illustrates some of the major components and sub-assemblies of a round-shape 4-side Identification Device, which as shown, could include: Top Cover (131) with installed Perimeter Adapters (141) in support of Perimeter Lighting for Identity Module; round-shape 4-side Identification Device sub-assembly (132); round-shape Combo Cover (128). Addition of Perimeter Adapters (141) could provide brighter Perimeter Lighting of the Identity Module, as required for specific applications.

FIG. 10 Illustrates major sub-assemblies for round-shaped 4-side Identification Device.

Figure elements are labeled as follows:

133—Round shape Combo Module sub-assembly, consisting of a round-shape Identity Module, round-shape Light Controller assembly, round-shape Status Module, and other support components, as needed.

134—Switch Module, which could be installed into Mounting Pole assembly (138)

136—Mounting Flange, which could be installed into Mounting Pole assembly (138), and which could be used for supporting round-shape Combo Module (133)

137—Interface female connector, which could be used for connecting to respective male interface connector of the Light Controller PCB assembly located inside Combo Module sub-assembly (133), and provide required electrical interface, such as: power, communications, etc.

138—Mounting Pole sub-assembly, which could be used for mechanical mounting and electrical interface of a round-shape Combo Module assembly (133).

140—Round-shaped Mounting Pole with Interface Wiring inside, in support of Combo Module (133)

151—Mounting hardware, which could be used for supporting Flange (136) to Mounting Pole (140)

FIG. 11 Illustrates 3-D and side views of an assembled round-shaped 4-side Identification Device assembly (139).

Figure elements are labeled same as on FIG. 10

FIG. 12 through FIG. 20 illustrates rectangular-shape 4-side Identification Device, which could include: rectangular-shape 4-side Identity Light sub-assembly, which could be designed to support multi-color Perimeter Lighting on top, and round-shape Status Light with multi-color Perimeter Lighting at the bottom; rectangular shape 4-side Combo Cover (182); and mounting components, as needed. FIG. 12 through FIG. 20 illustrates designs of rectangular shape Identification Devices, including utilization of Perimeter Lighting methods, to achieve the most effective utilization of Light Sources.

FIG. 12 Illustrates some of the major components and sub-assemblies of a rectangular-shape 4-side Identification Device sub-assembly; a Top Cover (178) with Perimeter Adapters (179) in support of Perimeter Lighting for Identity Module. This design, as shown, could use Light Sources located on the top side of Light Controller PC-board assembly (181) to provide Perimeter Lighting of the Identity Module, as required for specific applications. In addition, design could use Light Sources located on the bottom side of Light Controller PC-board assembly (181), which are not shown for simplicity, which could be used to provide Perimeter Lighting Perimeter Lighting for Status Light Module.

Figure elements are labeled as follows:

179—Perimeter Adapters, which could be used to optimize the size of the designated area within the Identity Module for Perimeter Lighting. Perimeter Adapters could be designed as an integral part of the Top Cover (178), or attached to the Top Cover (178) as one part, or as four individual parts.

180—Illumination or Light Module, which could be used for illuminating respective symbol of a rectangular-shaped Identification Module. As shown, up to four Light Modules could be installed, as needed. The shape of the Light Module assembly could be designed to match the interior shape of the Combo Cover (182), to minimize leakage of light to the sides of the Light Module.

181—Rectangular-shape Controller Board assembly with installed four Identity Light Modules (180); two-color Perimeter Lighting of Identity Module; two-color Perimeter Lighting of a Status Module

182—Combo Cover, consisting of rectangular-shape section for Identity and round-shape section for Status Light FIG. 13 Illustrates major sub-assemblies for rectangular-shaped 4-sides Identification Device Figure elements are labeled as follows:

183—Combo Module sub-assembly, consisting of a rectangular shape Identity Module, rectangular-shape Light Controller assembly, round-shape Status Module, and other support components, as needed

186—Switch Module, which could be installed into Mounting Pole assembly (186)

185—Mounting Flange, which could be installed into Mounting Pole assembly (186), and which could be used for supporting the lower round-shape section of the Combo Module (183)

191—Interface female connector, which could be used for connecting to respective male interface connector of the Light Controller PCB assembly located inside Combo Module sub-assembly (183), and provide required electrical interface, such as: power, communications, etc.

192—Mounting Pole sub-assembly, which could be used for mechanical mounting and electrical interface of a Combo Module assembly (183).

FIG. 14 Illustrates 3-D view of an assembled rectangular-shaped 4-sides Identification Device assembly.

Figure elements are labeled as follows:

183—Combo Module, which could consist of: four-quadrant rectangular-shape Identity Light assembly, Light Controller assembly; round Status Light; other support components, as needed.

The remaining elements are labeled same as on FIG. 13.

FIG. 15 Illustrates side view of an assembled rectangular-shaped 4-side Identification Device assembly.

For illustration purposes, the respective Combo Cover is shown as transparent.

Figure elements are labeled as follows:

188—Area between inner surface of the lower round-section of the Combo Light assembly (183) and outer surface of the upper section of the Mounting Pole assembly (193), which could be designated for Perimeter Lighting of the Status Light Module

189—Rectangular-shape Identity Module, which could consist of: four-quadrant rectangular Identity Light assembly, Light Controller assembly; other support component, as needed.

190—Round-shape Status Module, which could use Light Sources installed at the bottom side of Controller Board assembly inside Identity Module to create Perimeter Lighting of the Status Module within designated area (188).

The remaining elements are labeled same as on FIGS. 13 and 14

FIG. 16 Illustrates top view of a rectangular shape Light Controller PC board assembly (181), consisting of: installed four Illumination Modules (180); Light Sources, which could be used for Perimeter Lighting of Identity Module; and other support components FIG. 17. Illustrates side view of a rectangular shape Light Controller PC board assembly (181), shown on FIG. 16

Figure elements are labeled as follows:

194—Male connector installed at the bottom of the Light Controller PC board assembly (181), which could be used for interfacing Light Controller to external sources, such as: power, communications, etc.

FIG. 18 Illustrates bottom view of a rectangular shape Light Controller PC board assembly (181), consisting of: Light Sources, which could be used for Perimeter Lighting of Status Module; and other support components Figure elements are labeled as follows:

195—Perimeter of the area where Light Sources could be located for providing Perimeter Lighting for a Status Light Module.

FIG. 19 Top view of the rectangular shape Light Controller PC board assembly (152), shown without Illumination Modules installed.

Figure elements are labeled as follows:

103—Perimeter Lighting Sources, which could be of GREEN color, and could be used for providing Perimeter Lighting of a rectangular shape Identity Module

105—Perimeter Lighting Sources, which could be of RED color, and could be used for providing Perimeter Lighting of a rectangular shape Identity Module

113—Interface connector on Light Controller Board (152), which could be used for plugging-in Illumination Module

152—Rectangular-shape Light Controller Board with support for: up to four Illumination Modules for an Identity Module, dual color Lighting Sources (103, 105) for Perimeter Lighting of an Identity Module

153—Section of rectangular Light Controller PCB assembly (152), which could be designated for embedded Controller and other electronics, as needed FIG. 20 Side view of the rectangular shape Light Controller PC board assembly (152), shown on FIG. 19.

Figure elements are labeled as follows:

194—Male connector on a Light Controller assembly (152), which could be used for providing interface to power, controls and communications, as needed Remaining elements are labeled same as on FIG. 19.

FIG. 21 through FIG. 36 illustrates number of designs of a triangular-shape Identification Devices, which could provide the most cost-effective solutions for a variety of applications, including: identification of Point-of-service locations; etc.

FIG. 21 Illustrates some of the major components and sub-assemblies of a triangular-shape dual deck Identification Device with a triangular Top Cover (164) with triangular Perimeter Adapters (165) in support of Perimeter Lighting for Identity Module. This design, as shown, could use Light Sources located on the top side of Light Controller PC-board assembly (167) to provide Perimeter Lighting of the Identity Module, as required for specific applications. In addition, design could use Light Sources located on the bottom side of Light Controller PC-board assembly (167) to provide Perimeter Lighting Perimeter Lighting for Status Light Module.

Figure elements are labeled as follows:

165—Perimeter Adapters, which could be designed to optimize the size of the designated area within the Identity Module for Perimeter Lighting. Perimeter Adapters could be designed as an integral part of the Top Cover (164), or attached to the Top Cover (161) as one part, or as four individual parts.

166—Illumination or Light Module assembly, which could be used for illuminating respective symbol of a triangular-shaped Identification Module. As shown, two Light Modules could be installed, as needed. The shape of the Light Module assembly could be designed to match the interior shape of the Combo Cover (169), to minimize leakage of light to the sides of the Light Module.

167—Triangular-shape Controller Board assembly with installed two Identity Light Modules (166); two-color Perimeter Lighting of Identity Module; two-color Perimeter Lighting of a Status Module

169—Combo Cover, consisting of triangular-shape section for Identity and round-shape section for Status Light (162)

FIG. 22 Illustrates major sub-assemblies for triangular-shaped Identification Device Figure elements are labeled as follows:

170—Combo Module sub-assembly, consisting of a triangular shape Identity Module, triangular-shape Light Controller assembly, round-shape Status Module, and other support components, as needed

138—Mounting Pole sub-assembly, with installed support components, including Interface Wiring inside, in support of Combo Module (170) as needed

134—Switch Module, which could be installed into Mounting Pole assembly (138)

195—Mounting Flange, which could be installed into Mounting Pole assembly (138), and which could be used for supporting the lower round-shape section of the Combo Module (170)

176—Interface female connector, which could be used for connecting to respective male interface connector of the Light Controller PCB assembly located inside Combo Module sub-assembly (170), and provide required electrical interface, such as: power, communications, etc.

171—Section of triangular-shape Light Controller PCB assembly (167), which could be designated for embedded Controller and other electronics

Figure 25:
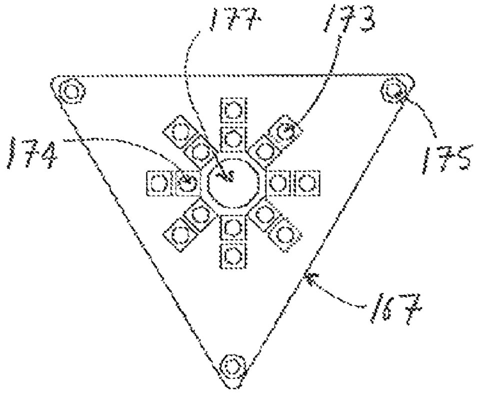

172—Light Sources, which could be used for Perimeter Lighting of Identity Module FIG. 25 Illustrates bottom view of a triangular shape Light Controller PC board assembly (167), consisting of: Light Sources (173, 174), which could be designed for Perimeter Lighting of Status Module; other support components Figure elements are labeled as follows:

175—Mounting posts, which could be used for attaching Light Controller PC board assembly (167) inside a triangular shape Combo Cover

177—Male connector installed at the bottom of the Light Controller PC board assembly (167), which could be used for interfacing Light Controller to external sources, such as: power, communications, etc.

Figure 24:
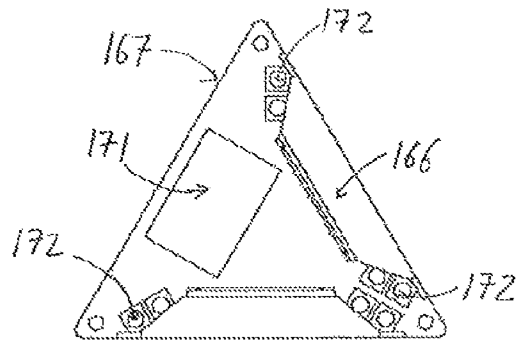
FIG. 24 Illustrates top view of a triangular shape Light Controller PC board assembly (167), consisting of: installed two Illumination Modules (166); Light Sources, which could be used for Perimeter Lighting of Identity Module; and other support components Figure elements are labeled as follows.
Figure 26:
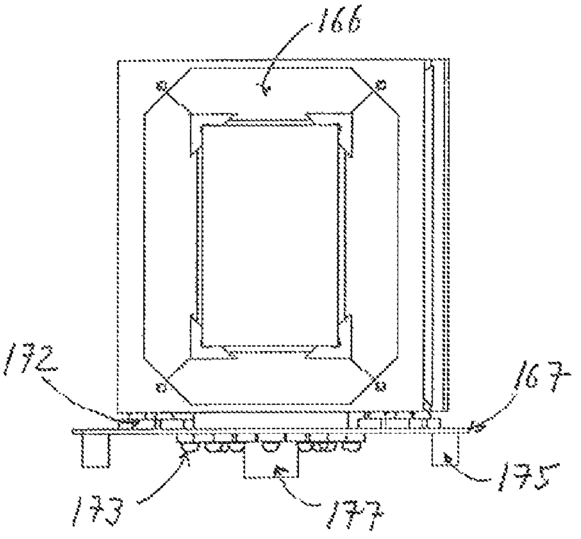

FIG. 26 Illustrates side view of a triangular shape Light Controller PC board assembly (167), shown on FIG. 24 and FIG. 25.

Figure elements are labeled same as on FIG. 24 and FIG. 25.

Figure 27:
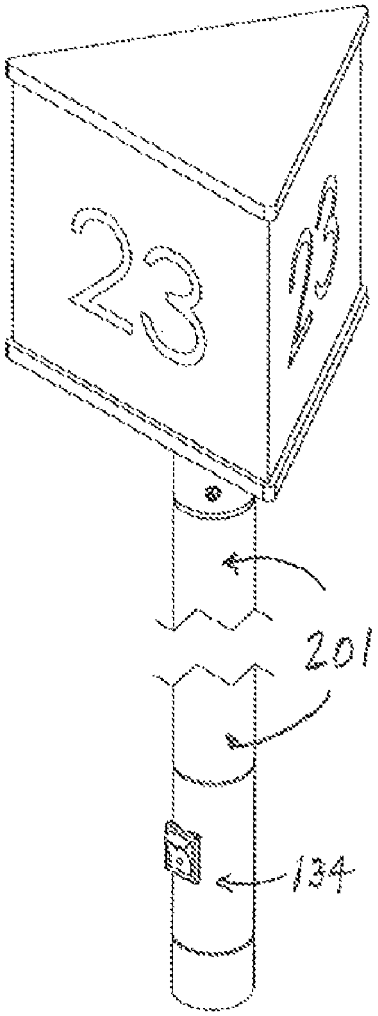

FIG. 27 Illustrates 3-D view of an assembled triangular-shaped Identification Device assembly, which could be based on Dual Function Identity/Status Light configuration. In this configuration, Identity Light functions or states could be controlled by turning the Illumination Modules ON or OFF, while Status Light functions or states could be controlled by cycling Illumination Modules ON/OFF at higher power, specified duration ratio (typically 50/50) and frequency. All these control features could be supported by triangular shape Light Controller installed inside. Respective control commands could come from one or combination of sources, which could include: operator, remote computer, remote Controller. As needed, optional Perimeter Lighting could be added to enhance the functionality.

Figure 28:
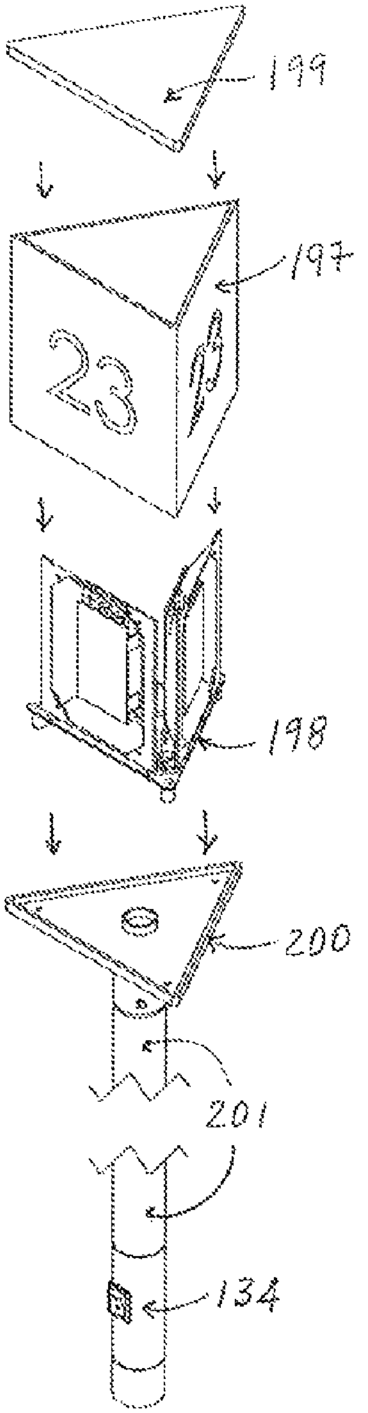

FIG. 28 Illustrates 3-D view of major components of the Identification Device assembly, shown on FIG. 27.

Figure elements are labeled as follows:

197—Triangular-shape uniformed Cover

198—Triangular shape Light Controller PC assembly, which could be designed without components in support of Perimeter Lighting

199—Triangular shape Top Lid

200—Triangular shape Mounting Flange

201—Mounting Pole of the Low-cost Point-of-service Identification Light assembly, shown with a Switch Module (134)

Figure 29:
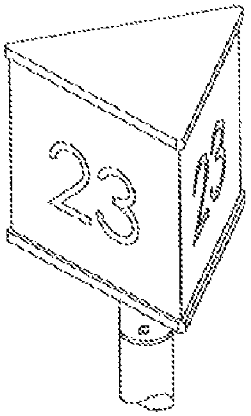

FIG. 29 Illustrates 3-D view of an assembled triangular-shaped Identification Device assembly with integrated Dual Function Identity/Status Light, which could consist of a triangular-shape Light Controller PC-board sub-assembly, with installed up-to-three Illumination Modules, which could be controlled in Dual Function modes—Identity mode (ON or OFF), Status mode (blinking ON/OFF at higher power, specified frequencies, Beacon Effect in selected direction, etc.), with other support components, as needed. Selection of: color for Enclosure and Illumination Modules; Identity Symbols, etc.—could be per requirements of a specific application.

Figure 30:
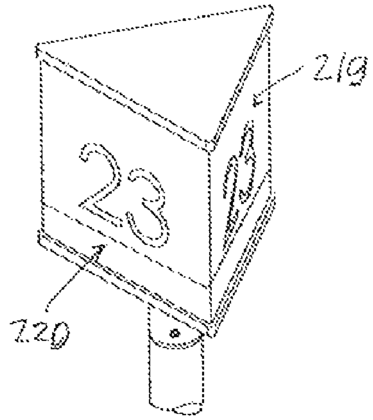

FIG. 30 Illustrates 3-D view of an assembled triangular-shaped Identification Device assembly with a uniformed Combo Cover, which could consist of a triangular-shape Light Controller PC-board sub-assembly, with installed: up-to-three Illumination Modules; top side Perimeter Lighting for Identity Module (219); bottom side Perimeter Lighting for Status Module (220). Identity Module modes could be selected as: ON/OFF; Beacon Effect; etc. Status modes could be selected as: ON/OFF; blinking ON/OFF at specified frequencies; Beacon Effect in selected direction, etc.

Figure 31:
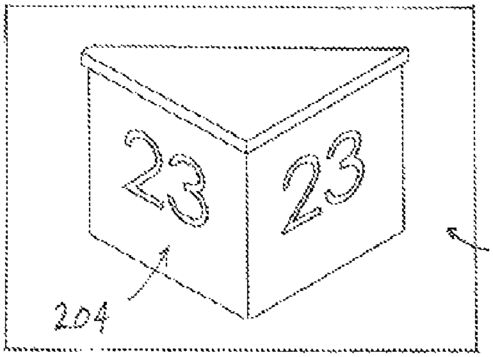

FIG. 31 Illustrates 3-D view of a wall-mount triangular-shaped 2-sides Identification Device assembly (204) with a uniformed Combo Cover, which could consist of a Light Controller PC-board sub-assembly, with installed two Illumination Modules; with optional top side Perimeter Lighting for Identity Module; bottom side Perimeter Lighting for Status Module. The Light Controller PC-board sub-assembly could be designed to accommodate required packaging behind the wall (206). In addition, only a Mounting Flange, as needed, could be used for supporting the Identification Light, and connection of the power, controls and communications to the Light Controller PC-board assembly could be via interface cable, which could be secured to the inner side of the wall.

Figure 32:
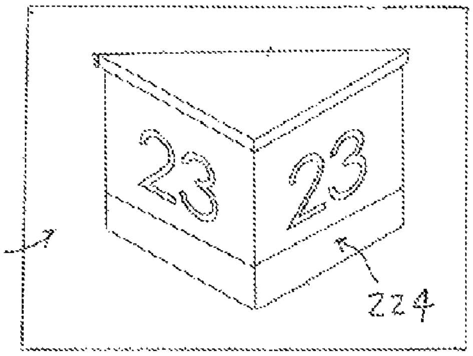
Figure 33:
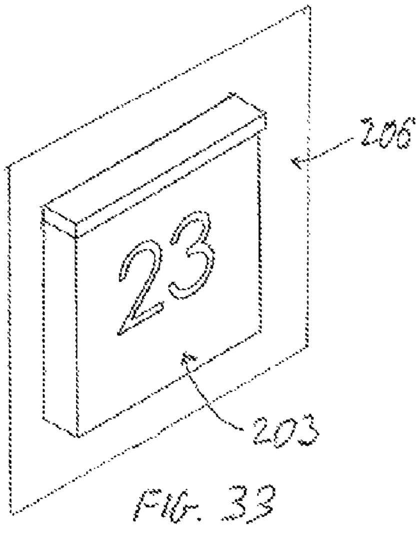

FIG. 32 Illustrates 3-D view of a wall-mount triangular-shaped Identification Device assembly shown on FIG. 31, with addition of respective components in support of a dedicated section (224) of Perimeter Lighting for Status Module FIG. 33 Illustrates 3-D view of a wall-mount rectangular-shaped 1-side Identification Device assembly (203) with a uniformed Combo Cover, which could consist of a Light Controller PC-board sub-assembly, with installed one Illumination Modules; with optional top side Perimeter Lighting for Identity Module; bottom side Perimeter Lighting for Status Module. The Light Controller PC-board sub-assembly could be designed to accommodate required packaging behind the wall (206). In addition, only a Mounting Flange, as needed, could be used for supporting the Identification Light, and connection of the power, controls and communications to the Light Controller PC-board assembly could be via interface cable, which could be secured to the inner side of the wall.

Figure 34:
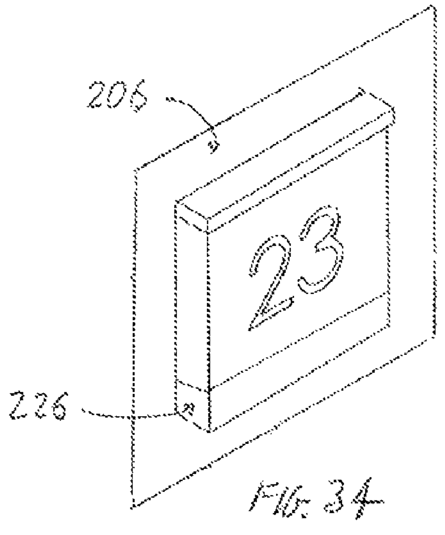
Figure 35:
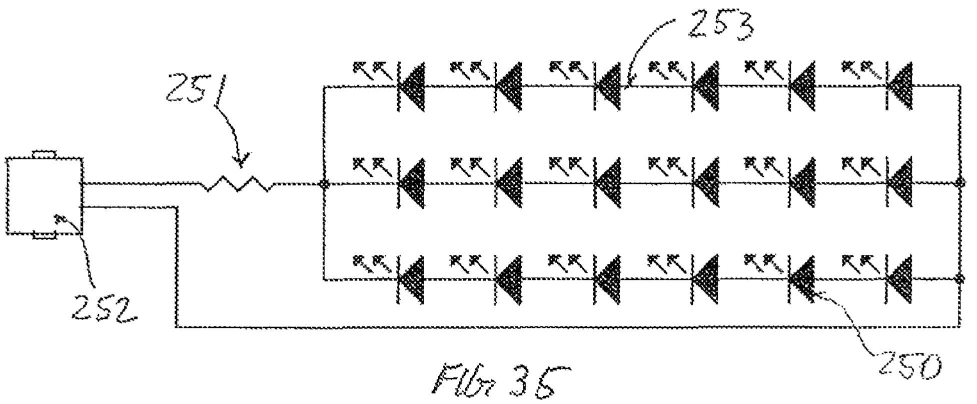

FIG. 34 Illustrates 3-D view of a wall-mount rectangular-shaped 1-side Identification Device assembly shown on FIG. 33, with addition of respective components in support of a dedicated section (226) of Perimeter Lighting for Status Module FIG. 35 Illustrates conventional schematic or wiring method of Illumination Devices (250), which could be used as needed for control of Illumination Modules. The control power could be applied via connector (252), and amount of power could be controlled via resistor component (251). In the event an LED within a group of LED's connected in-series, as illustrated by connection (253), would fail, the entire section of respective LED's would stop operating, which could present a significant problem.

Figure 36:
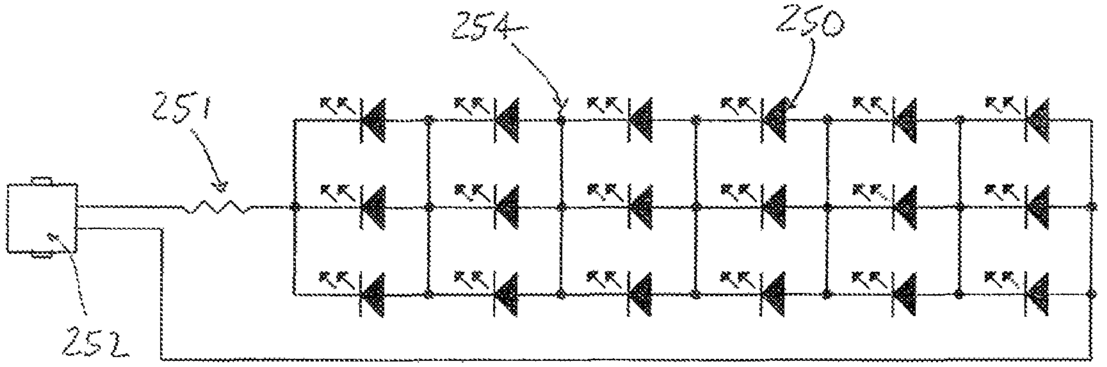

FIG. 36 Illustrates proposed Matrix schematic or wiring method of Illumination Devices (250), which could be used as needed for control of Illumination Modules. The control power could be applied via connector (252), and amount of power could be controlled via resistor component (251). As shown, the Matrix method would ensure, that any single LED failure would not affect operation of the remaining LED's.

In addition, the Matrix method could also ensure that even multiple failure of LED's would reduce possibility of an impact on operation of remaining LED's.

FIG. 37 through FIG. 45 illustrates designs of various:

a) Modular Identification Devices, which could be assembled or stacked side-by-side, and b) Single unit Identification Devices.

Modular Identification Devices offer following features:

1) Expandable, as needed. Additional Secondary Identification Modules could be added, which could provide additional functions and/or features, as needed. These Secondary Identification Modules could have required: power and control electronics; Illumination Devices; support components, etc.—as required.

2) Re-configurable, as needed. An entire assembled Modular Identification Device could be easily upgraded, as needed. An assembled Modular Identification Device could be separated onto individual Identification Modules, which could be then re-configured, and re-assembled back to an upgraded Modular Identification Device, as needed. Re-configuration could include: replacing an entire Module with another one; replacing Front Panel on a given Module with another Front Panel with required Symbol(s) and/or number(s); etc.

3) Extended operation. A failed Module within Modular Identification Device, could be easily replaced with a new one. Since the Front Panel is replaceable, it is possible, for a specific application, such as identification of an apartment building and apartments within it, to keep as spares required number of: Main Identification Modules, Secondary Identification Modules, Front Plates with pre-screened numbers; etc.

4) Immediate availability. Variety of popular configurations of: Main Identification Devices; Secondary Identification Devices; Front Panels with numbers, etc.; mounting accessories; etc.—could be sold in stores as individual items, or in a form of a kit.

5) On-line availability. A custom configuration of: Main Identification Devices; Secondary Identification Devices; Front Panels with numbers, etc.; mounting accessories; etc.—could be ordered directly on-line, and delivered within a relatively short period of time as individual items, or in a form of a kit.

Single unit Identification Devices offer following features:

1) Low cost. For applications, such as a track development of residential houses, a specific design and configuration of an Identification Devices could be selected from a standard range of previously designed models (in terms of: size, features, etc.), and then delivered for installation. Most popular sizes and configurations (in terms of: features, etc.) of Identification Devices could be pre-assembled with a blank Front Panel or without Front Panel. Then, as requested, required numbers, symbols, etc.—could be placed or attached to the respective Front Panels, creating a unique Identification Device.

2) Uniformity. For some applications, a uniformed number of standard or custom designed Identification Devices could be easily made available, which could distinguish an application from others, as needed.

3) Immediate availability. Variety of popular configurations of a single unit Identification Device with a blank Front Panel could be sold in stores as individual items. In addition, popular self-adhesive type: symbols, numbers, etc. could be also sold in stores. Once purchased, these symbols could be then adhered to respective sections on the Front Panel, per provided instructions. In addition, various mounting kits for single unit Identification Device could be also sold in stores.

4) On-line availability. A custom configuration of an Identification Device(s), including selection of: size, colors, symbols, fonts, control options, security options, power options, mounting accessories; etc.—could be ordered directly on-line, and delivered within a relatively short period of time.

Illustrations of Identification Devices in this drawing could be used in a variety of applications, and could be most effective in identification of: buildings; sections within buildings; street signs; etc. For simplicity, single and dual "number-type" Identification Devices are shown, as examples. Proposed technology could be successfully applied to implementation of any combination of: signs, symbols, numbers, etc.

Figure 37:
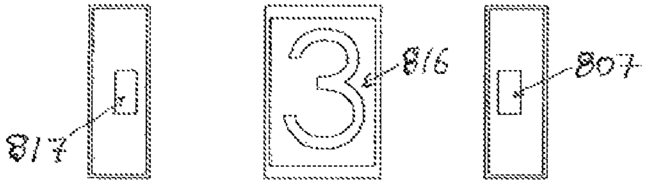

FIG. 37 Illustrates various views of a single number (as shown, the number is "3"), symbol or multi-symbol Identification Module (816), which could be used as: stand-alone Identification Device, or as a Main Module of a multi-staked side-by-side modular Identification Device Figure elements are labeled as follows:

817—Connector, which could be used for plugging in optional Modules, such as: speaker, status, etc,

807—Connector, which could be used for interfacing Secondary Modules

Figure 38:
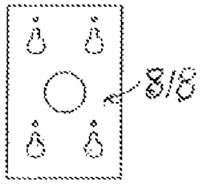
Figure 39:
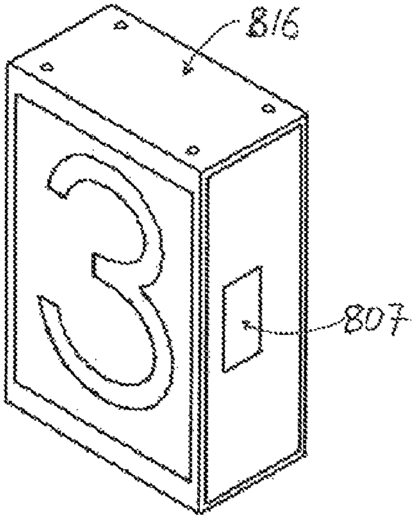

FIG. 38 Illustrates mounting flange (818), which could be used for mounting and attaching Identification Device (816) to a flat surface, such as a wall of a building, etc, FIG. 39 Illustrates 3-D view of the Identification Module (816), shown on FIG. 37, with connector (807) for plugging in Secondary Module.

Figure 40:
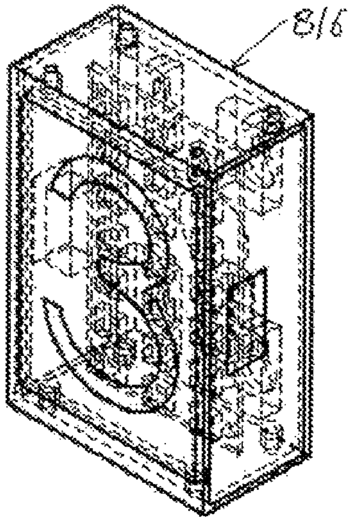

FIG. 40 Illustrates 3-D view of the Identification Module (816), with the enclosure made transparent for illustration purposes of the construction details inside.

Figure 41:
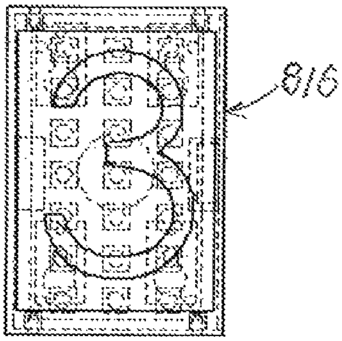

FIG. 41 Front view of the Identification Module (816), shown on FIG. 40

Figure 42:
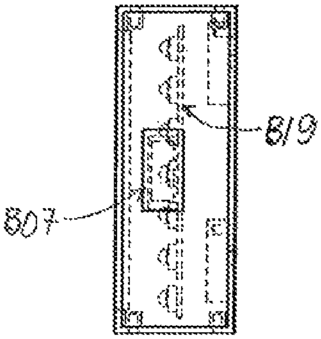

FIG. 42 Side view of the Identification Module (816), shown on FIG. 40

Figure elements are labeled as follows:

807—Connector, which could be used for interfacing Secondary Modules

819—Main Module control PC-board assembly

Figure 43:
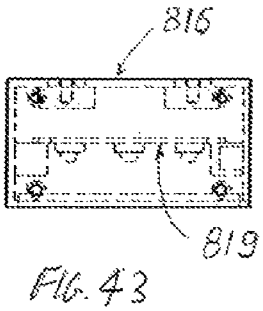

FIG. 43 Top view of the Identification Module (816), shown on FIG. 40.

Figure 44:
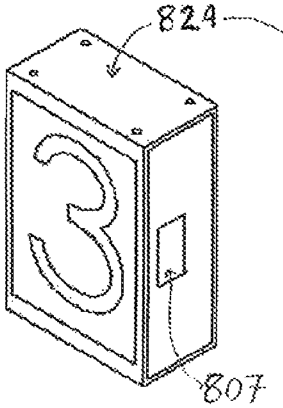

FIG. 44 Illustrates 3-D view of a Secondary Identification Module (824), with connector (807) for plugging in other Secondary Module, as needed. As shown, is designed to illuminate identification number "3".

Figure 45:
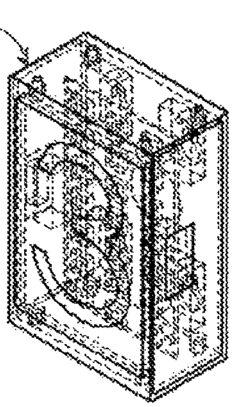

FIG. 45 Illustrates 3-D view of the Secondary Identification Module (816), with the enclosure made transparent for illustration purposes of the construction details inside.

Figure 1:
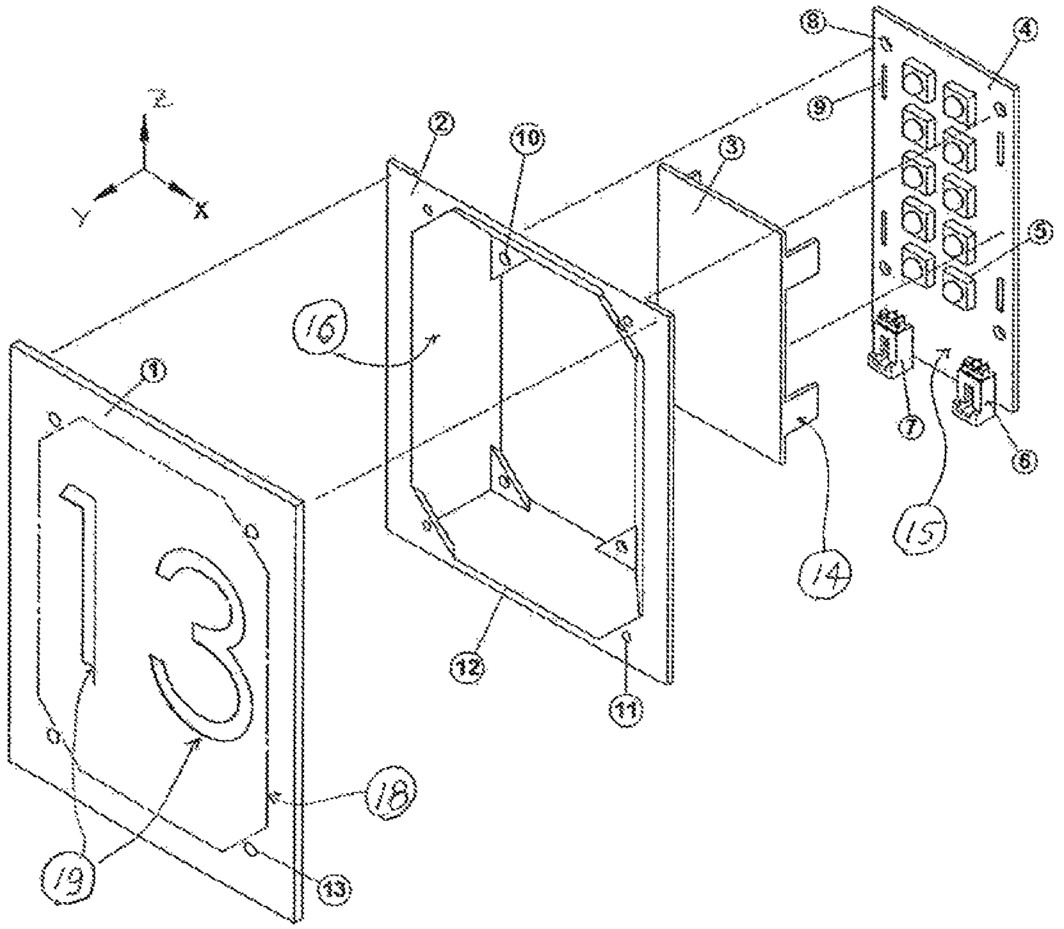
Figure 2:
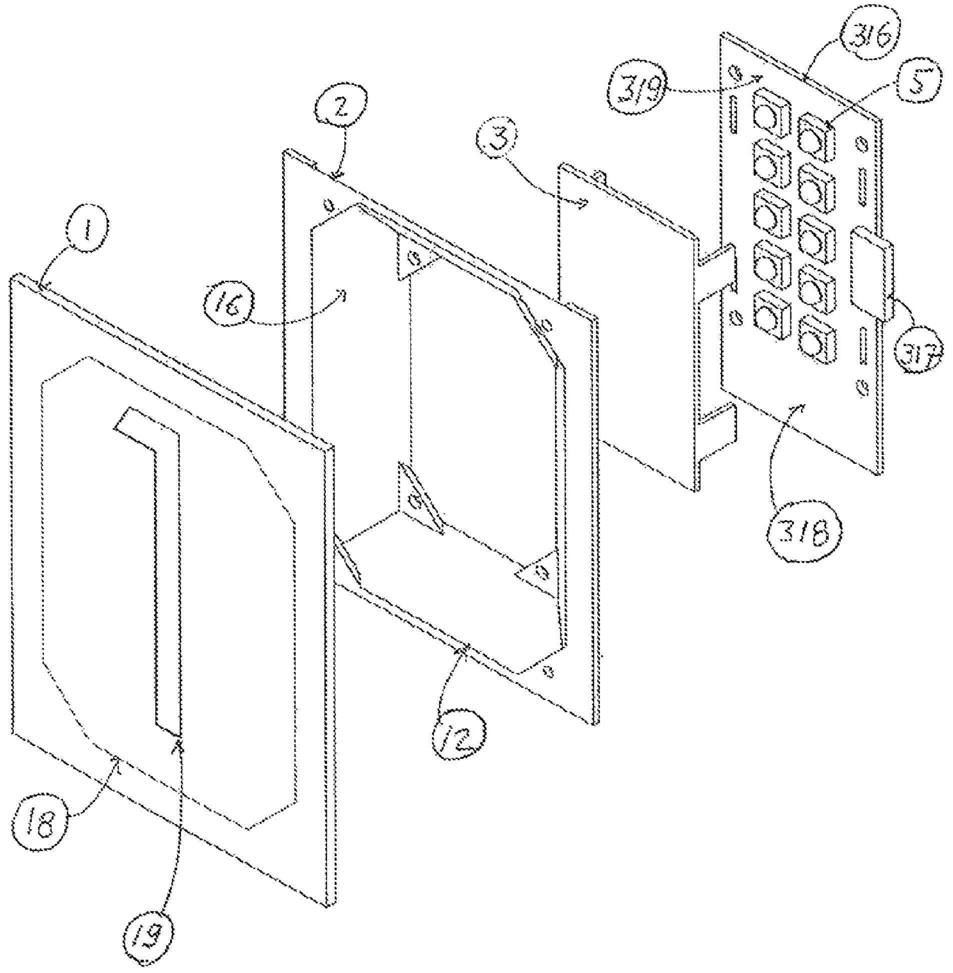
Figure 3:
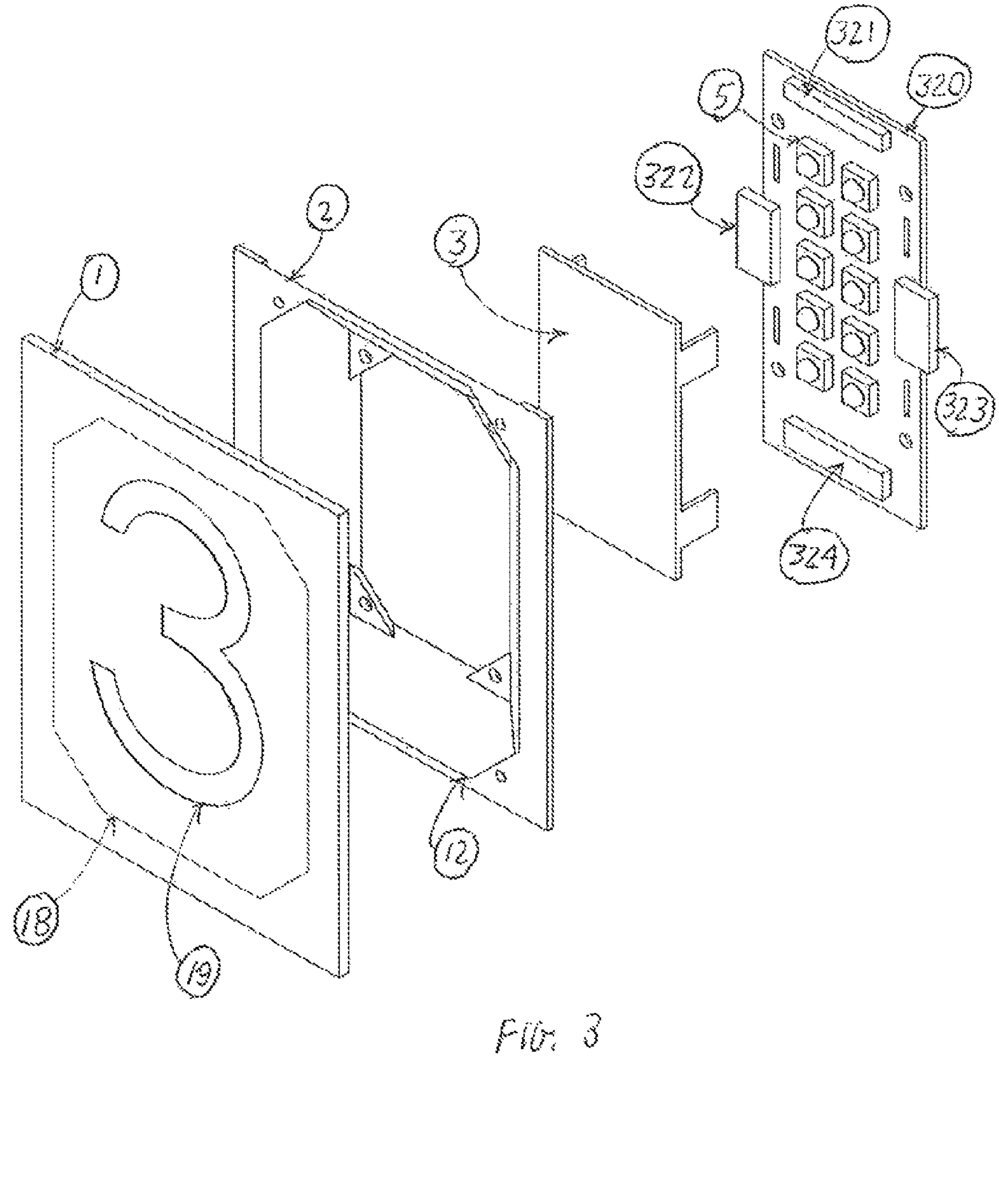
Figure 4:
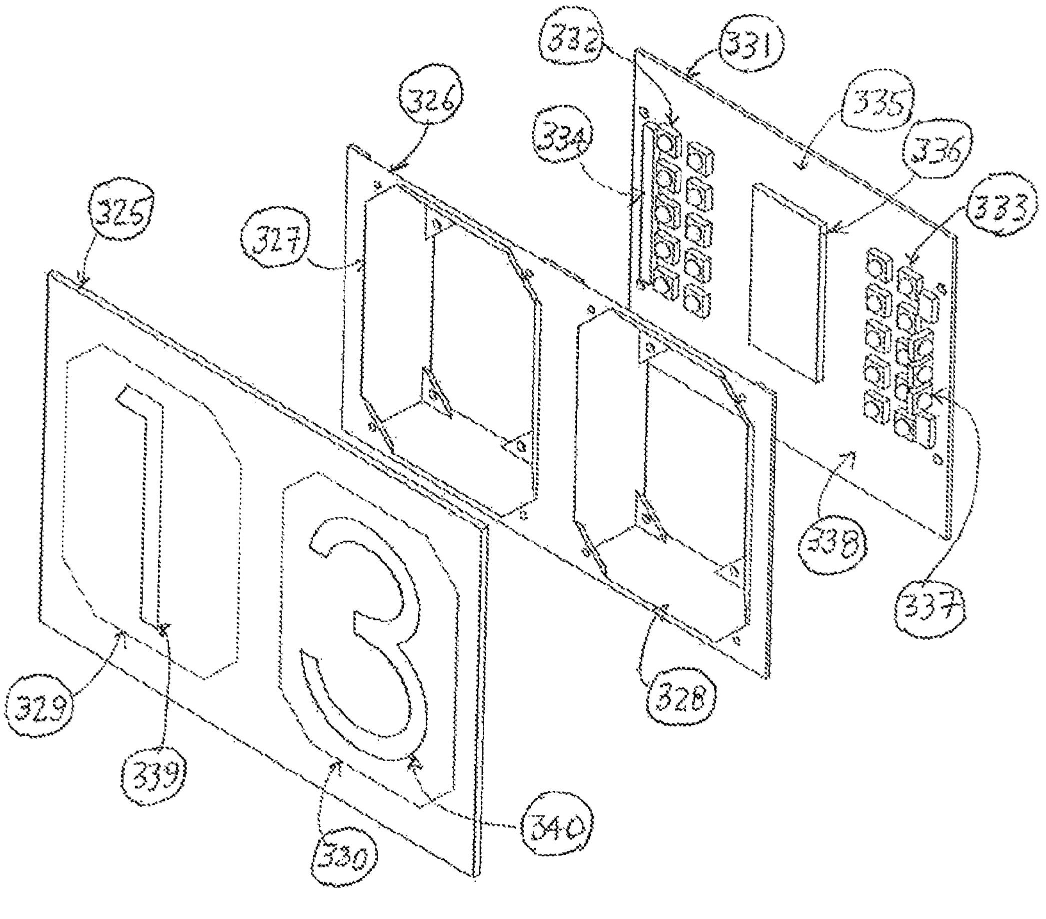
Figure 5:
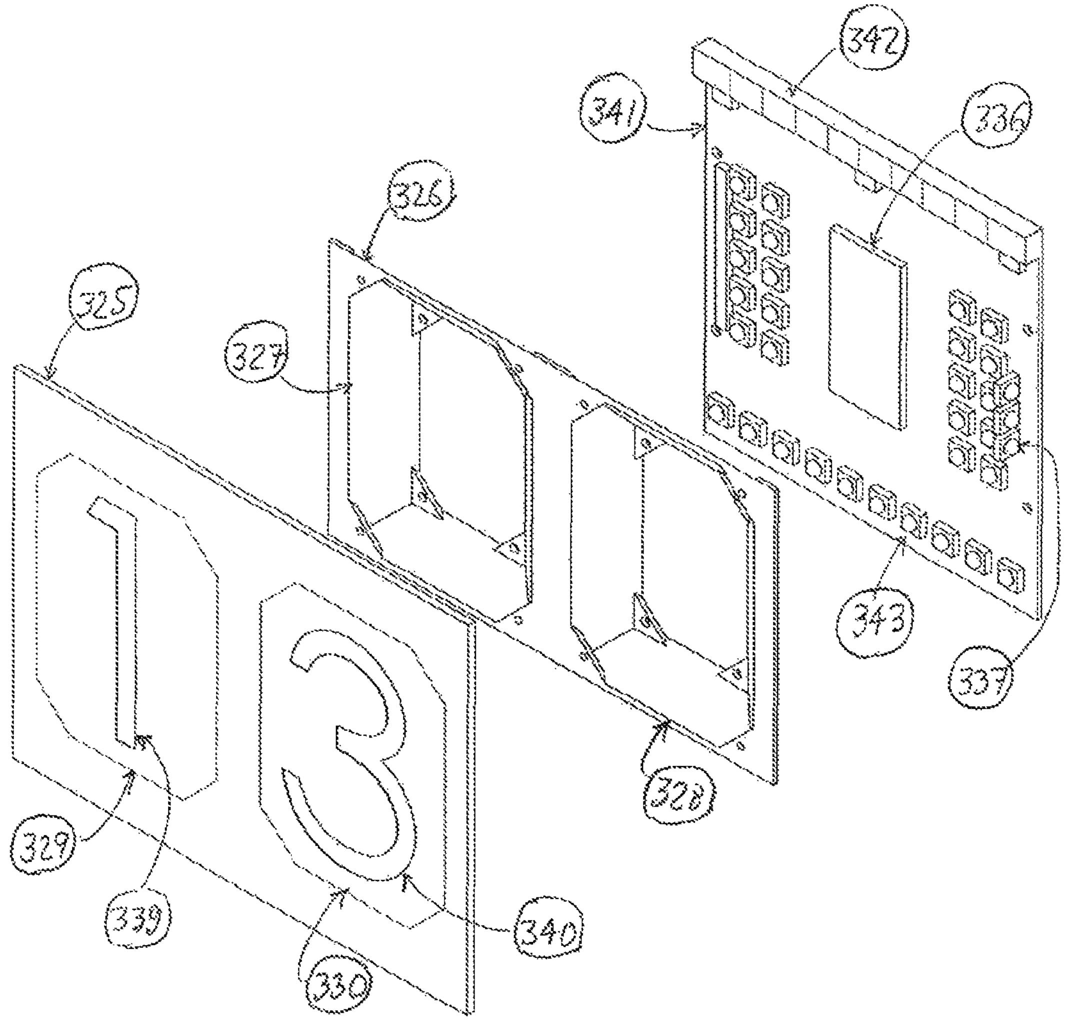
Figure 46:
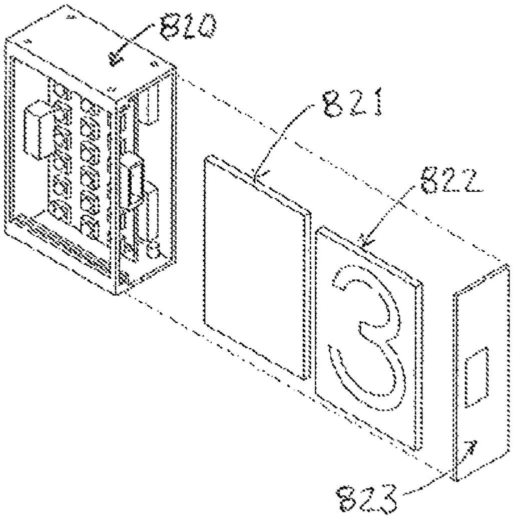

FIG. 46 3-D view of assembly details of the Identification Module (816), shown on FIG. 39.

Figure elements are labeled as follows:

820—Sub-assembly, which includes: enclosure; control PC-board assembly; other support components, as needed

821—Light Correction component

822—Front Panel, which as shown, could have a single number "3", as an example, which could be silk-screened on the top

823—Side support panel, which could enclose the sub-assembly (820). This panel, as shown, could have an opening for mating connectors to be plugged into the connector (807)

Figure 47:
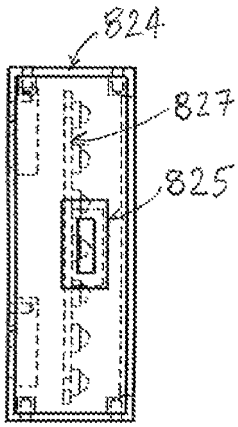

FIG. 47 Illustrates left side view of the Secondary Identification Module (824), with the enclosure made transparent for illustration purposes of the construction details inside.

Figure 48:
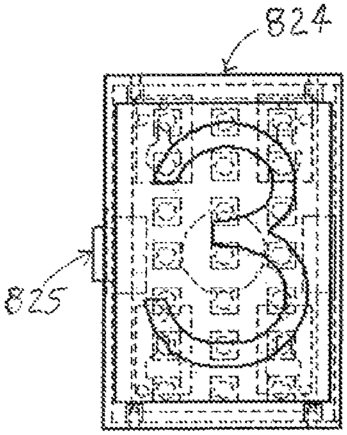

Figure elements are labeled as follows:

825—Connector, which could be used for interfacing to Main Identification Module FIG. 48 Illustrates front view of the Secondary Identification Module (824), shown on FIG. 47 As shown, the identification number is "3"

Figure 49:
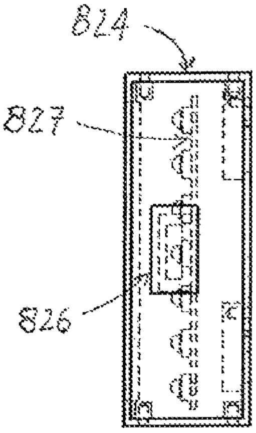

FIG. 49 Illustrates right side view of the Secondary Identification Module (824), shown on FIG. 47.

Figure 50:
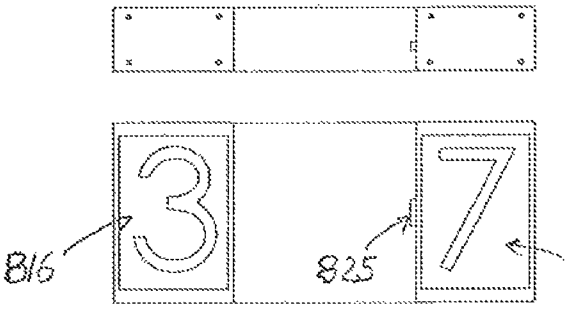

Figure elements are labeled as follows:

826—Connector, which could be used for interfacing to other Secondary Identification Module FIG. 50 Illustrates front view of 2-number Modular Identification Device construction detail for a number combination of "37", which could be based on single number "3" Main Module (816) and a single number "7" Secondary Module (828).

Figure 51:
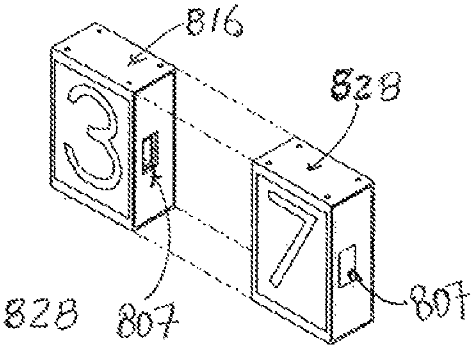

FIG. 51 Illustrates 3-D view of construction details of a 2-number "37" Modular Identification Device, shown on FIG. 50.

Figure elements are labeled as follows:

807—Connector, which could be used for interfacing Secondary Modules

Remaining elements are labeled same as on FIG. 50.

Figure 52:
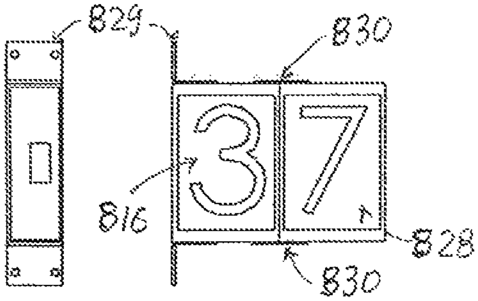

FIG. 52 Illustrates views of a mounting method, which could be used for a 2-number "37" Modular Identification Device, shown on FIG. 50. This method could be used for attachment to a flat surface.

Figure elements are labeled as follows:

829—Mounting bracket

830—Support plates, one from the top and another one from the bottom

Remaining elements are labeled same as on FIG. 50

Figure 53:
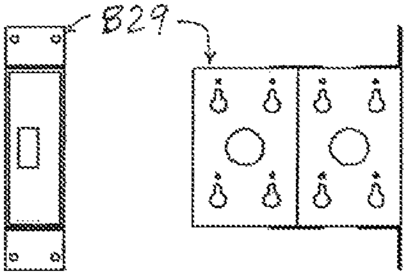

FIG. 53 Illustrates rear view of the mounting method, which could be used for a 2-number "37" Modular Identification Device, shown on FIG. 52.

Figure 54:
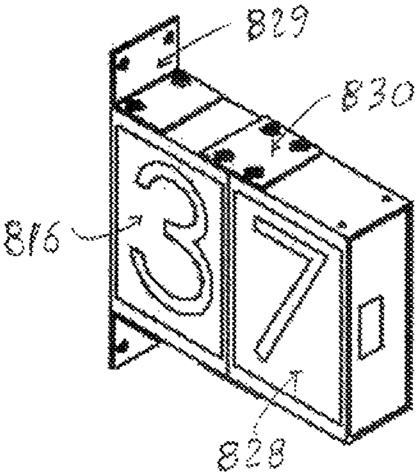

FIG. 54 Illustrates 3-D view of a mounting method of the 2-number "37" Identification Device, shown on FIG. 52.

Figure 55:
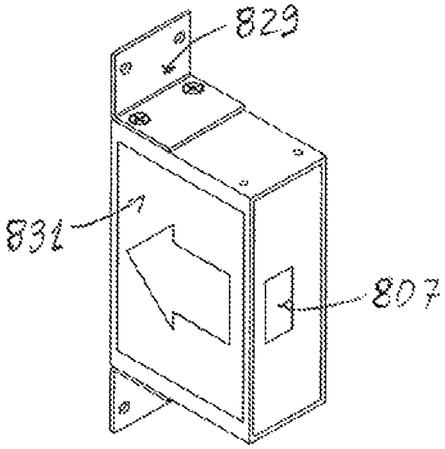

FIG. 55 Illustrates 3-D view of a mounting method of a single symbol "←" Identification Device (831).

Figure elements are labeled as follows:

807—Connector, which could be used for interfacing Secondary Modules

829—Mounting bracket

Figure 56:
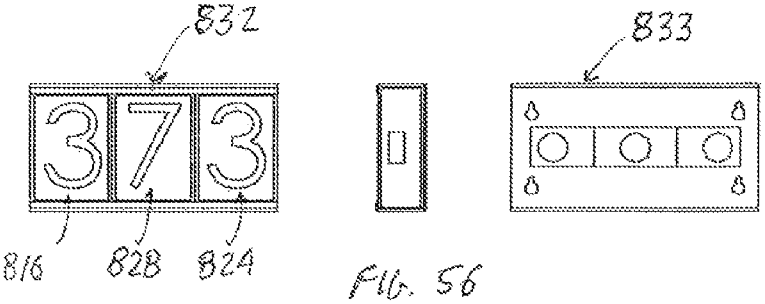

FIG. 56 Illustrates front view of a 3-number "373" Modular Identification Device, which could be assembled using: Main Identification Device (816), and two Secondary Identification Devices (828) and (824) connected side-by-side, which could be then installed inside mounting bracket (833), as shown.

Figure 57:
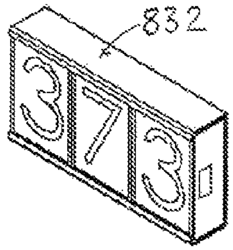

FIG. 57 Illustrates 3-D view of a 3-number "373" Identification Device shown on FIG. 56

Figure 58:
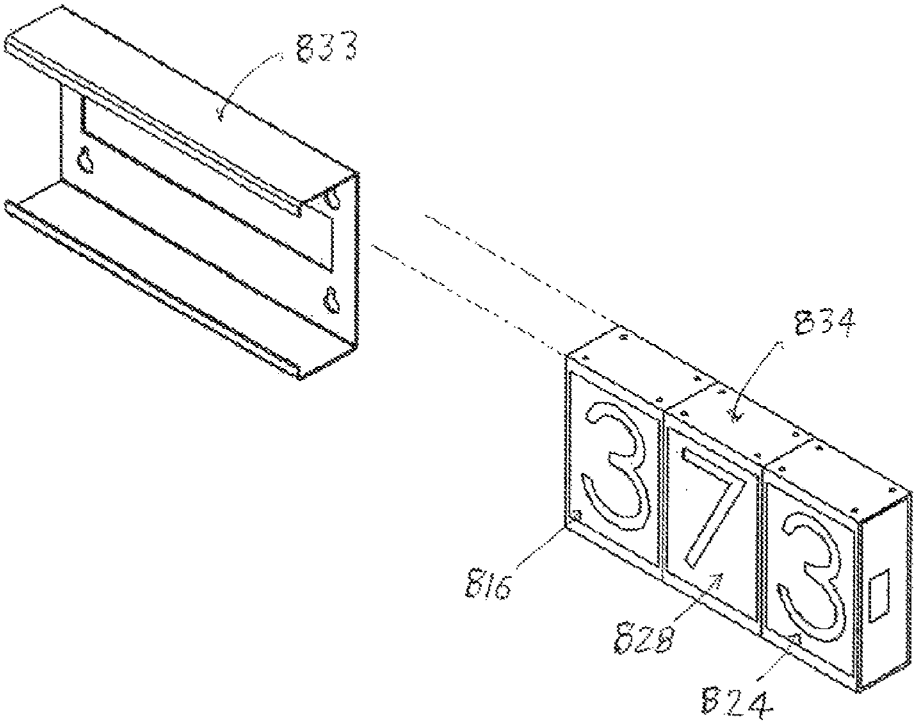

FIG. 58 Illustrates 3-D view of a mounting method, which could be used for a 3-number "373" Identification Device shown on FIG. 56. Figure elements are labeled same as on FIG. 56.

Figure 59:
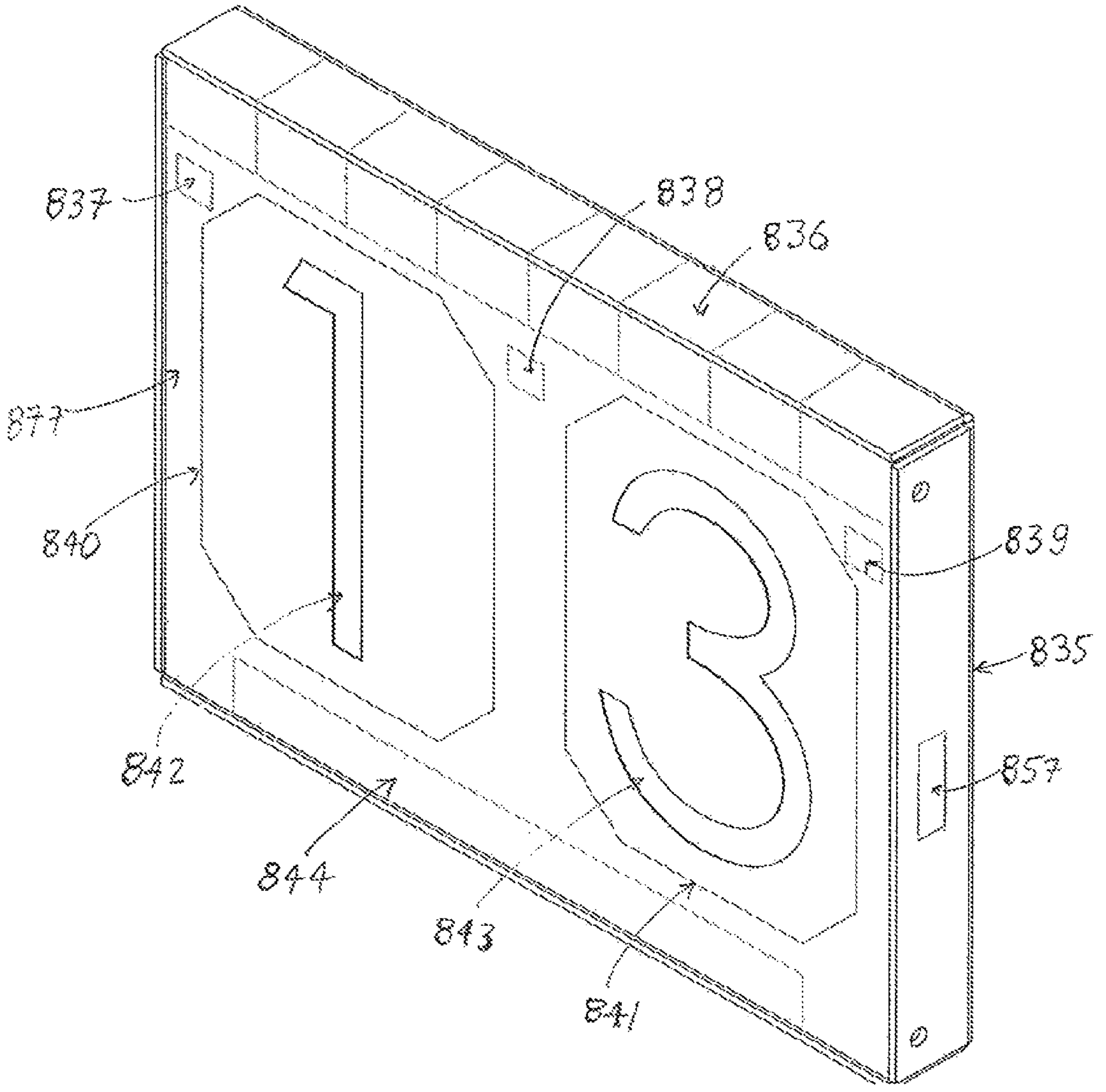

FIG. 59 Illustrates 3-D view of a 2-number "13" Identification Device assembly (835), which could include a number of optional features, as required for a specific application. In example shown, the Identification Device is suitable for indoor and/or outdoor installation, and could be used for: identification of a building, such as: residential, commercial, etc.; an apartment identification within a building; etc. For simplicity, only a 2-number configuration is shown. As required, the proposed design could be used for implementation of: a multi-number and/or multi-symbol Identification Device, with required standard and optional features—to meet specific requirements of practically any application. Location of: sensors, Perimeter Lighting, Status Identification, and other components—could be arranged, as needed. Controller could use sensors to detect respective conditions, which could be defined, set or pre-programmed by an user, and which, as instructed by an user, could request Controller upon detection of a specific condition or combination of conditions—to activate user-selected or user-programmed control function or functions, which could include: turning on power for Illumination Devices; turning on power for Perimeter Lighting; flashing ON-OFF Illumination Devices; playing pre-recorded audio over speaker; etc. The setting of trigger points for sensor devices, control functions associated with a condition when a trigger point or points have been detected—could be set and/or programmed by an user via wireless remote control device, which could include: hand-held device, computer, etc. As needed, respective set and/or pre-programmed control data or trigger points for each sensor, respective control functions, etc.—could be selected by an user via: wireless remote control device, and then could be stored in a non-volatile memory of the Controller.

Figure elements are labeled as follows:

836—section of (835), which could be allocated and used for installation of a Solar Battery

837—section of (835), which could be allocated and used for installation of a "motion detector sensor". Controller could use this sensor to detect presence of an object, which could be set or pre-programmed by an user, and which, as instructed by an user, could request Controller to activate user-selected or user-programmed control function, which could include: turning on power for Illumination Devices; play a stored audio recording over speaker (877), the content of which could be stored among other "stored audio recordings", in a non-volatile memory of the Controller.

838—section of (835), which could be allocated and used for installation of an "exterior light sensor". Controller could use this sensor to detect condition of the exterior light intensity, which could be set or pre-programmed by an user, and which, as instructed by an user, could request Controller to activate user-selected or user-programmed control function, which could include: turning on power for Illumination Devices; etc.

839—section of (835), which could be allocated and used for installation of a "remote control sensor". Controller could use this sensor to detect commands, which could be transmitted by a wireless control device, which could include: hand-held device/programmer; computer; etc.

840—section of (835), which could be allocated as a Designated Area for illumination of a number "1"

841—section of (835), which could be allocated as a Designated Area for illumination of a number "3"

842—represents number "1", as an example of a general symbol which could be placed inside (840)

843—represents number "3", as an example of a general symbol which could be placed inside (841)

844—section of (835), which could be allocated for any combination of: Perimeter Lighting; Status Identification; illumination of special symbols, name tag, etc.; decorative lighting; etc.

857—section of (835), which could be allocated for viewing status of diagnostic LED's, which could be located on the control PC-board inside (835)

FIG. 60 through FIG. 88—illustrates variety of support components, which could be designed and used for a variety of shapes and configurations of Identification Devices. As with main components, support components could be designed to contribute for achieving the most effective utilization of Light Sources.

Figure 60:
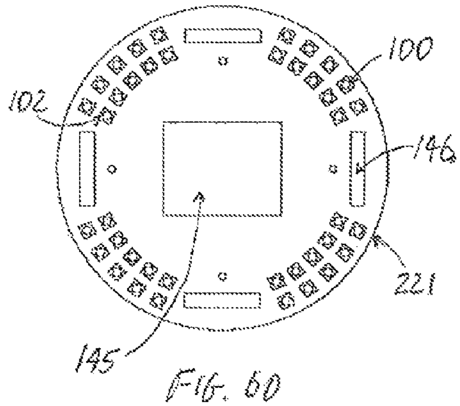

FIG. 60 Top view of a round shape Light or Identification Control Board assembly (221), which could have: section (145) allocated for power and control components, which could include embedded Controller; installed four connectors (146) for plugging in respective Light Modules; section allocated for dual color Light Sources (100,102), which could be used for Perimeter Lighting of an Identity Module.

Figure elements are labeled as follows:

100—Round-shape positioned group of Light Sources, which could be of GREEN color, and which could be used for GREEN-colored Perimeter Lighting of an Identity Module

Figure 61:
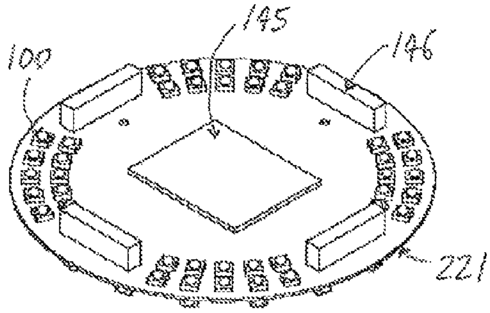

102—Round-shape positioned group of Light Sources, which could be of RED color, and which could be used for RED-colored Perimeter Lighting of an Identity Module FIG. 61. Top 3-D view of a round shape Light Control Board assembly (221), shown on FIG. 60.

Figure 62:
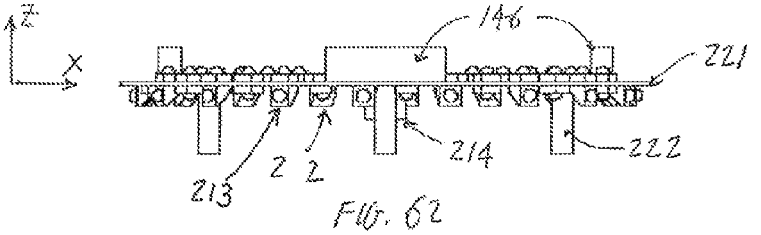

FIG. 62. Side view of a round shape Light Control Board assembly (221), shown on FIG. 60.

Figure elements are labeled as follows:

212—Round-shape positioned group of Light Sources, which could be of GREEN color, and which could be used for GREEN-colored Perimeter Lighting of an Identity Module shining its illumination inside the Module along Z-axis (not clearly marked on drawing)

213—Round-shape positioned group of Light Sources, which could be of RED color, and which could be used for RED-colored Perimeter Lighting of a Status Module shining its illumination directly toward a dedicated Status Light section

214—Female connector, which could be used for interfacing to required: power, control and communications for Identification Control Board assembly (221)

Figure 63:
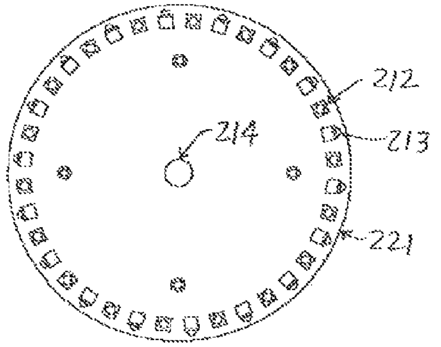
Figure 64:
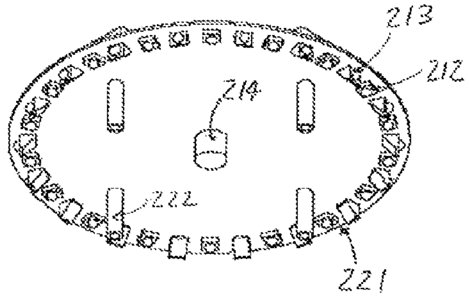

222—One of mounting posts, which could be used for installation of the Identification Control Board (221) inside an enclosure FIG. 63. Bottom view of a round shape Light Control Board assembly (221), shown on FIG. 60, which shows on of the methods of arranging Illumination Devices (212, 213) to produce required Perimeter Lighting FIG. 64. Bottom 3-D view of a round shape Light Control Board assembly (221), shown on FIG. 60.

Figure 65:
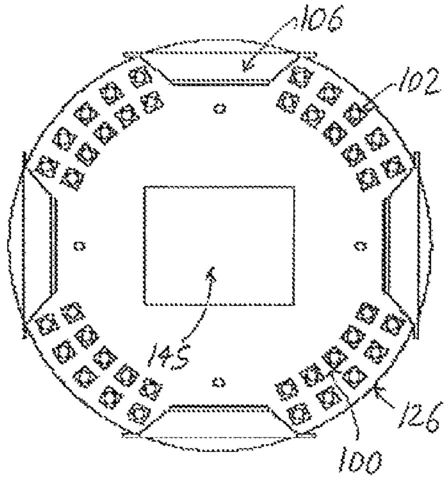

FIG. 65. Top view of a round shape Identification Device sub-assembly (126), which could consist of Light Control PC-board assembly similar to the (221) shown on FIG. 60, with installed four Light Modules (106) in support of a quad Identity Module (not shown). The dual color Light Sources (100,102) could be used for Perimeter Lighting of an Identity Module.

Figure 66:
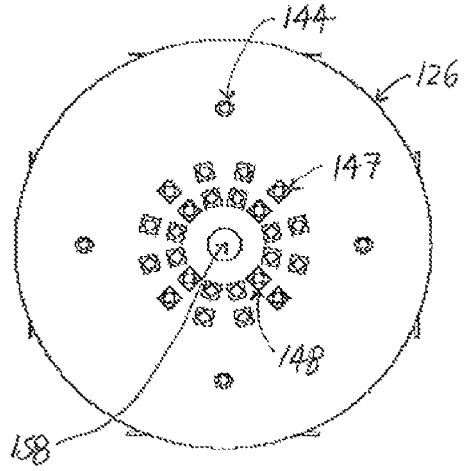

FIG. 66. Bottom view of a round shape Identification Device sub-assembly (126), shown on FIG. 65, with details regarding Light Controller Board assembly (126) arrangement of Illumination Devices at the bottom to include: dual color Light Sources (147,148), which could be used for Perimeter Lighting of a Status Module; four mounting posts (144) for attachment of assembly (126) to a Light Cover (not shown).

Figure elements are labeled as follows:

147—Round-shape positioned group of Light Sources, which could be of GREEN color, and which could be used for GREEN-colored Perimeter Lighting of a Status Module

148—Round-shape positioned group of Light Sources, which could be of RED color, and which could be used for RED-colored Perimeter Lighting of a Status Module

158—Male connector for interfacing to respective female connector of a Mounting Pole for providing required power and communications interface to Controller assembly (126)

Figure 67:
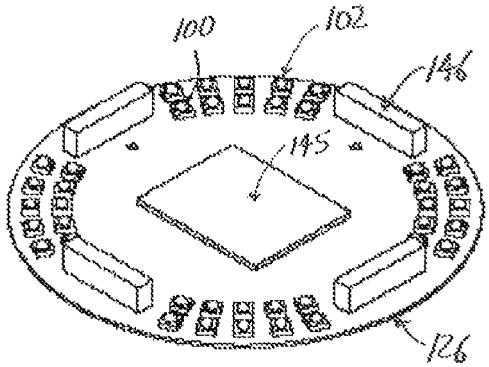

FIG. 67. Top 3-D view of a round shape Light Control Board assembly (126), with four Light Modules removed for simplicity.

Figure elements are labeled as follows:

146—One of four interface connectors for installing a Light Module

Figure 68:
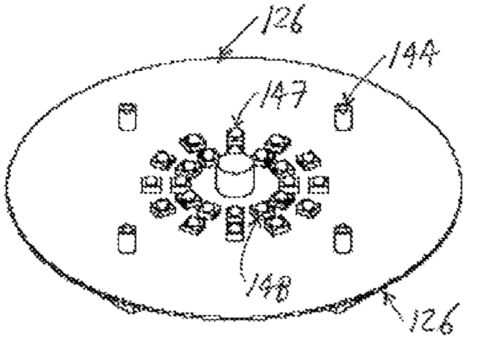

FIG. 68. Bottom 3-D view of a round shape Light Control Board assembly (126), shown on FIG. 67.

Figure 69:
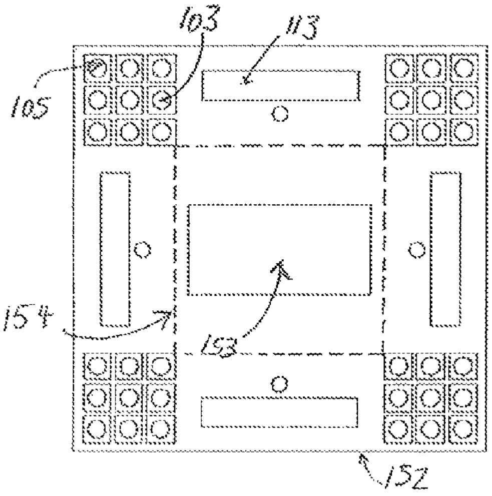

FIG. 69. Top view of a rectangular shape Light Controller Board assembly (152) with: an embedded Controller section (153); four interface connectors (113) for rectangular shape Light Modules (not shown) in support of a quad rectangular-shape Identity Module (not shown); dual color Light Sources (103,105), which could be used for Perimeter Lighting of an Identity Module.

Figure elements are labeled as follows:

103—Rectangular-shape positioned group of Light Sources, which could be of GREEN color, and which could be used for GREEN-colored Perimeter Lighting of a rectangular-shape Identity Module

105—Rectangular-shape positioned group of Light Sources, which could be of RED color, and which could be used for RED-colored Perimeter Lighting of a rectangular-shape Identity Module

153—Section of the Light Controller PCB assembly (152), which could be allocated for embedded Controller and support electronics, as needed.

Figure 70:
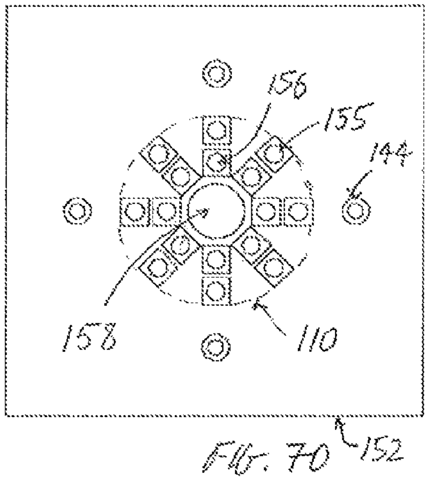

154—Section of the Light Controller PCB assembly (152), which could be enclosed in-between inner surface of a Cover (not shown) and outer surface of Perimeter Adapters (not shown), and which could be used for Perimeter Lighting of an Identity Module FIG. 70. Bottom view of a rectangular shape Light Controller Board assembly (152) with: dual color Light Sources (155,156), which could be used for Perimeter Lighting of a Status Module.

Figure elements are labeled as follows:

110—Section of the Light Controller PCB assembly (152), which could be enclosed by the lower section of a Combo Cover (not shown), and which could be used for Perimeter Lighting of a Status Module

144—Mounting posts, which could be used for attaching assembly (152) inside a rectangular-shape Light Cover (not shown)

158—Male connector for interfacing to respective female connector of a Mounting Pole (not shown) for providing required power and communications interface to Controller assembly (152)

Figure 71:
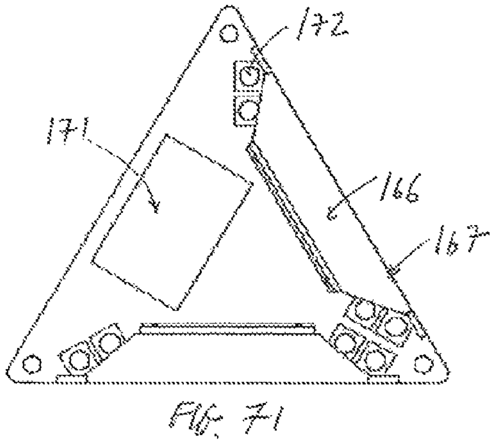

FIG. 71. Illustrates top view of a triangular shape Light Controller PC board assembly (167), consisting of: installed two Illumination Modules (166); Light Sources, which could be used for Perimeter Lighting of Identity Module; and other support components Figure elements are labeled as follows:

171—Section of triangular-shape Light Controller PCB assembly (167), which could be designated for embedded Controller and other electronics

Figure 72:
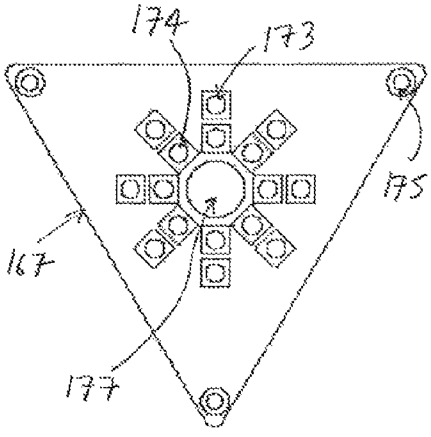

172—Light Sources, which could be used for Perimeter Lighting of Identity Module FIG. 72. Illustrates bottom view of a triangular shape Light Controller PC board assembly (167), consisting of: Light Sources (173, 174), which could be used for Perimeter Lighting of Status Module; and other support components Figure elements are labeled as follows:

175—Mounting posts, which could be used for attaching Light Controller PC board assembly (167) inside triangular shape Combo Cover

177—Male connector installed at the bottom of the Light Controller PC board assembly (167), which could be used for interfacing Light Controller to external sources, such as: power, communications, etc.

Figure 73:
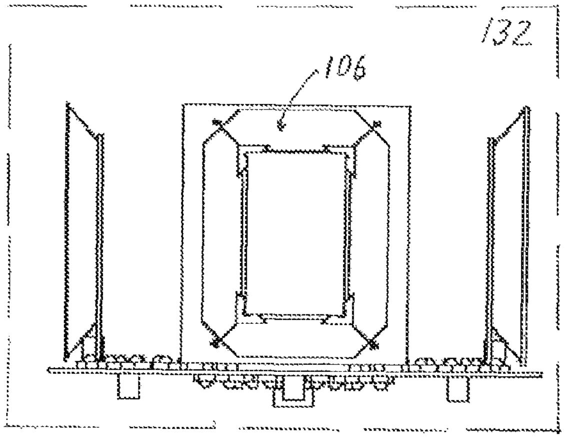

FIG. 73. Illustrates side view of a round shape Light Controller PC board assembly (132) with installed four Illumination Modules (106), and other components, as needed.

Figure 74:
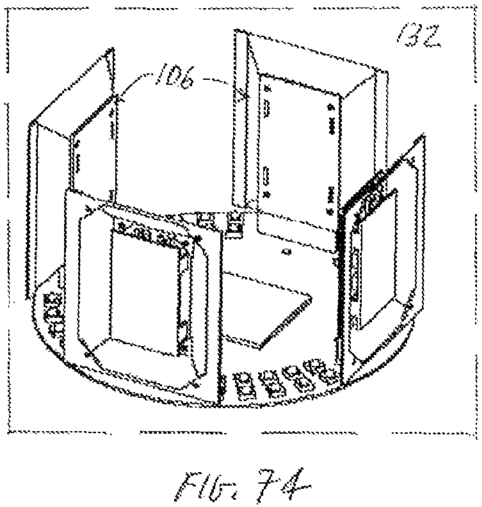

FIG. 74. Illustrates 3-D view of a round shape Light Controller PC board assembly (132) shown on FIG. 73.

Figure 6:
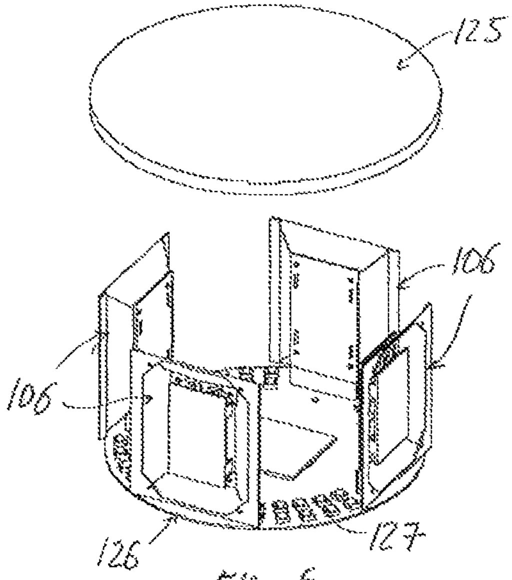
Figure 75:
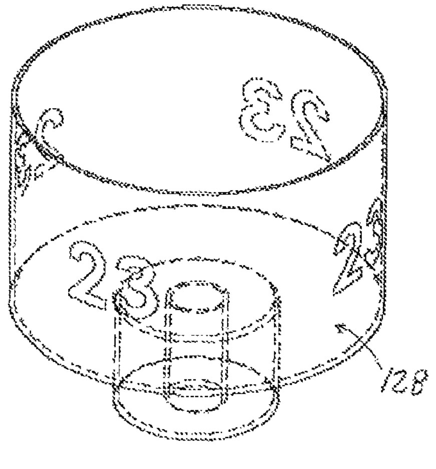

FIG. 75. Illustrates 3-D view of a round shape dual deck Combo Cover (128) with a section in the lower part designed in support of Perimeter Lighting of a Status Module. For reference—FIG. 6.

Figure 7:
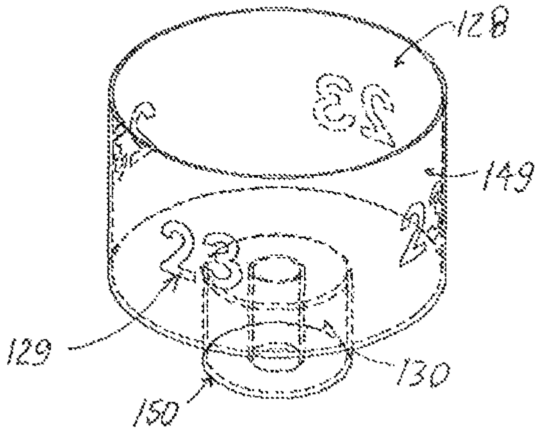
Figure 8:
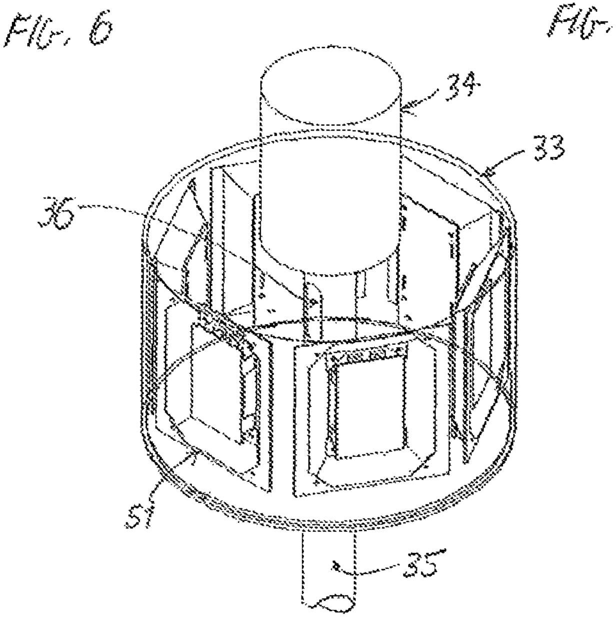
Figure 9:
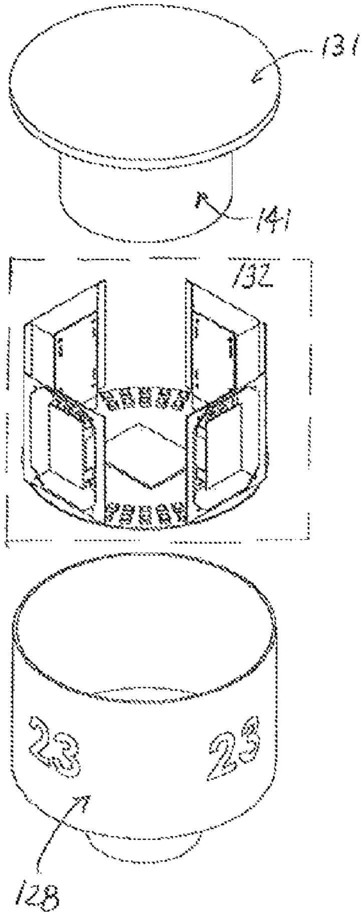
Figure 10:
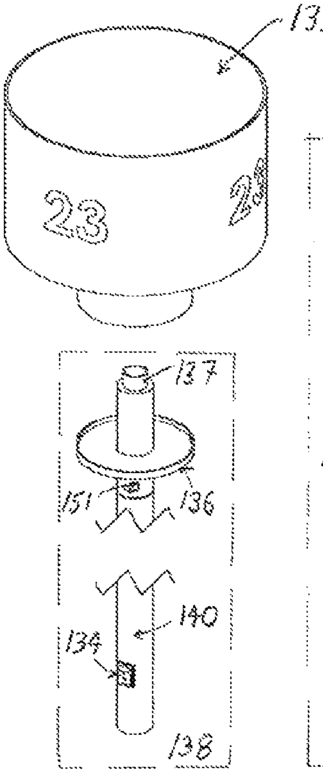
Figure 11:
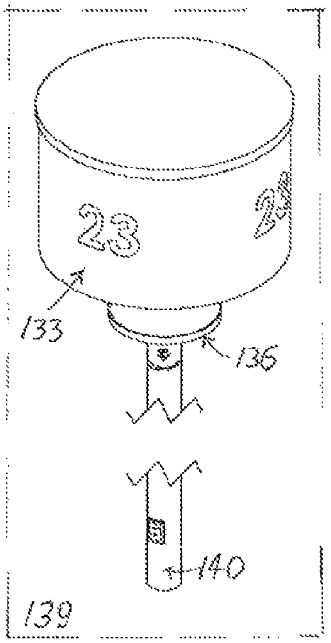
Figure 12:
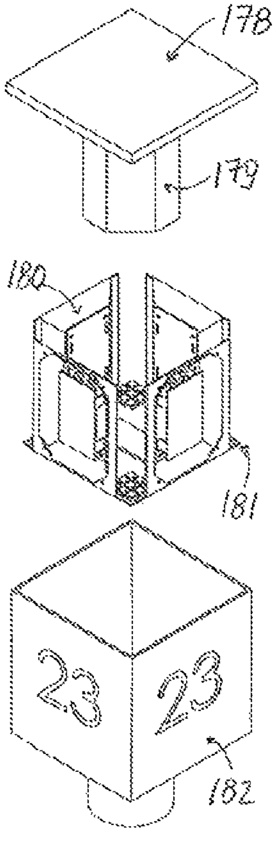
Figure 13:
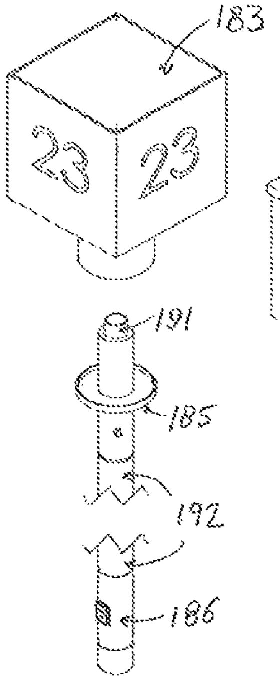
Figure 14:
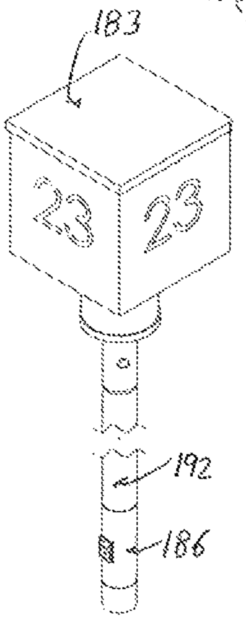
Figure 15:
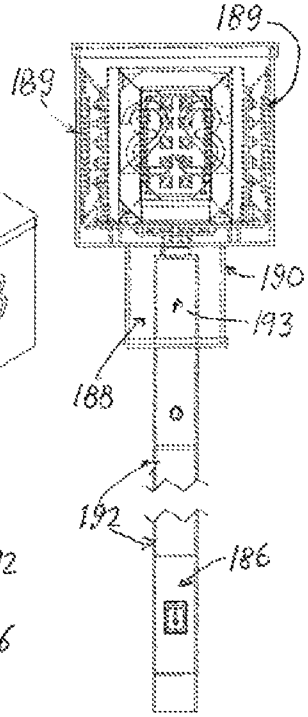
Figure 16:
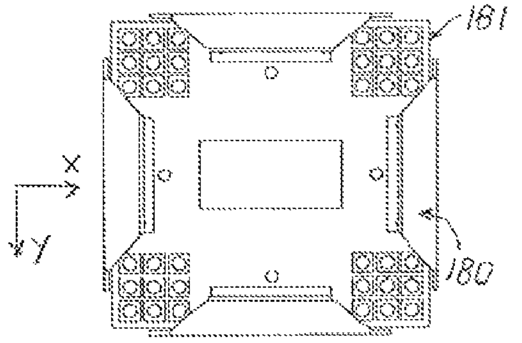
Figure 17:
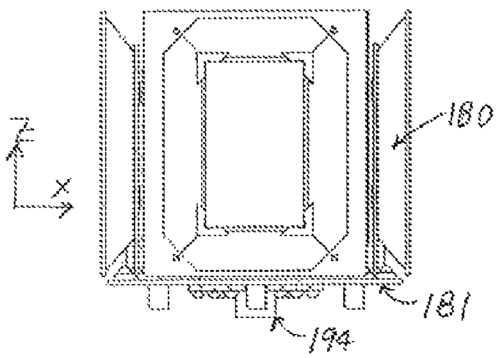
Figure 18:
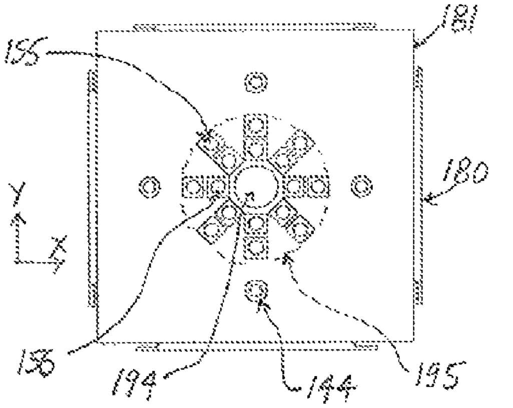
Figure 19:
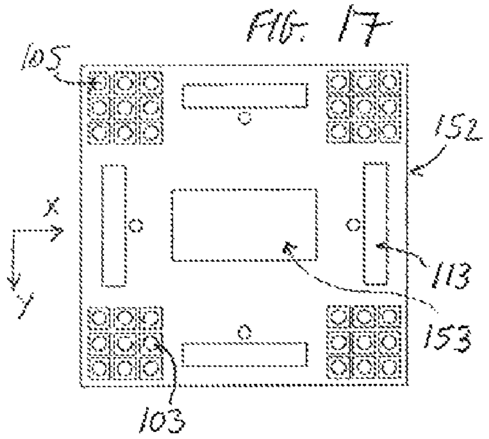
Figure 20:
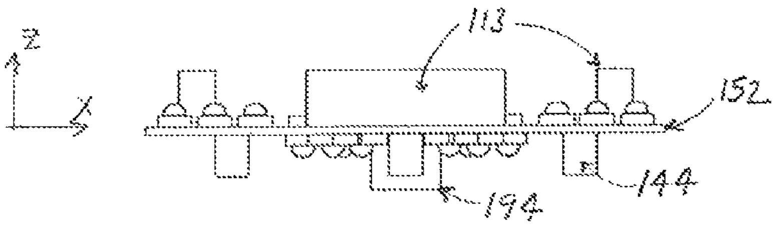
Figure 21:
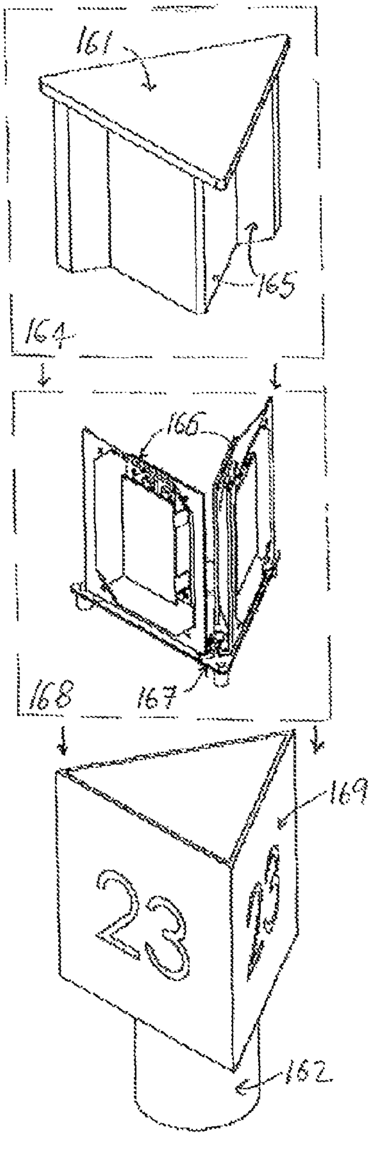
Figure 22:
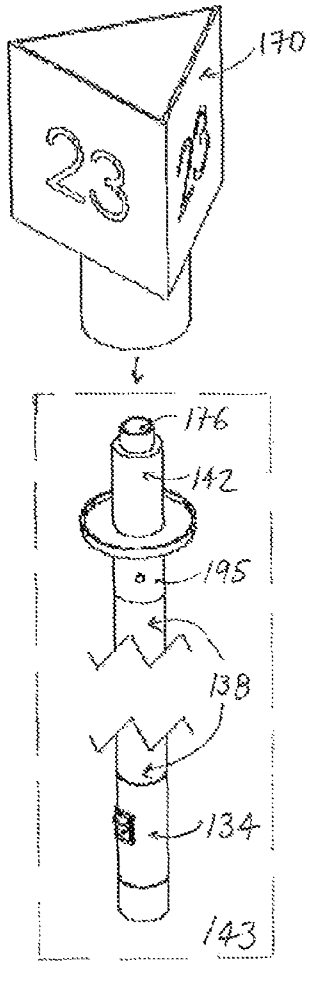
Figure 23:
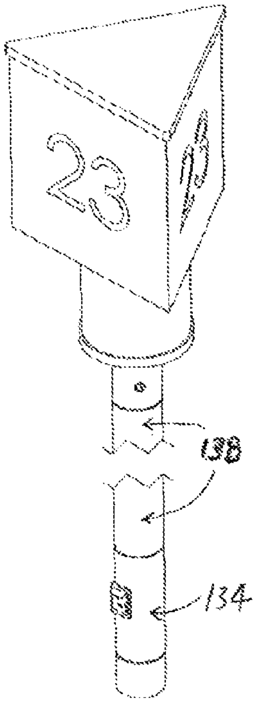
FIG. 23 Illustrates 3-D view of an assembled triangular-shaped 2-sides Identification Device assembly. Figure elements are labeled same as on FIG. 22
Figure 76:
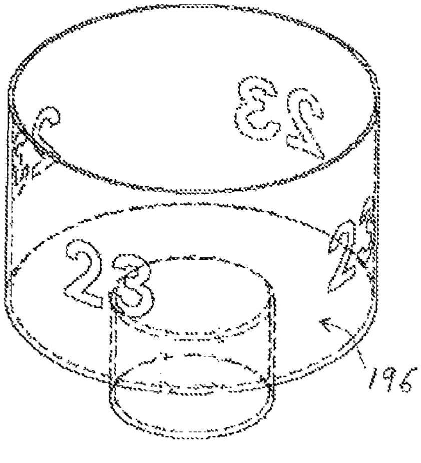

FIG. 76. Illustrates 3-D view of a round shape dual deck low-cost Combo Cover (196), which has no section shaped by itself in support of Perimeter Lighting of a Status Module. When this type of Cover is used, the area for Perimeter Lighting for a Status Module could be defined as a section in-between the inner surface of the lower part of the Cover (196) and the outer surface of a Mounting Flange or a Mounting Pole (not shown). For reference—FIG. 7.

Figure 77:
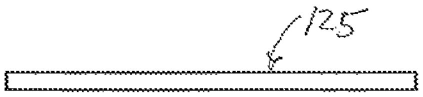

FIG. 77 Illustrates side view of a round shape Top Lid (125) component. For simplicity, optional features, which could be designed for proper installation and removal of the Top Lid from respective round-shape Cover—are not shown.

Figure 78:
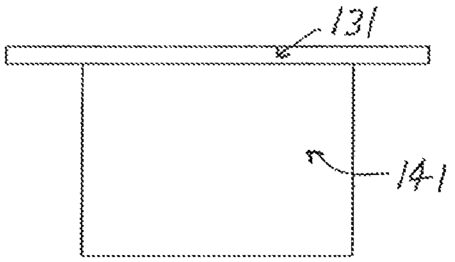

FIG. 78 Illustrates side view of a round shape Top Lid (131) with installed Perimeter Adapter (141), which could be used in support of Perimeter Lighting of an Identity Module. For simplicity, optional features, which could be designed for proper installation and removal of Perimeter Adapter, and the Top Lid from respective round-shape Cover—are not shown.

Figure 79:
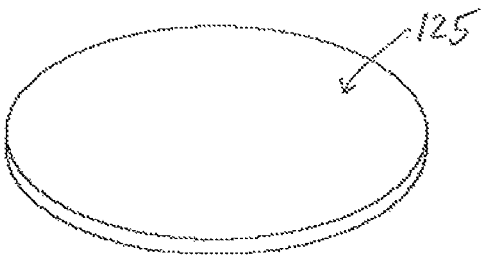

FIG. 79 Illustrates 3-D view of a round shape Top Lid (125) shown on FIG. 77.

Figure 80:
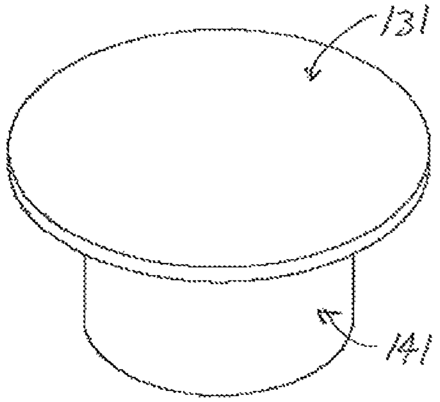

FIG. 80. Illustrates 3-D view of a round shape Top Lid (131) assembly shown on FIG. 78.

Figure 81:
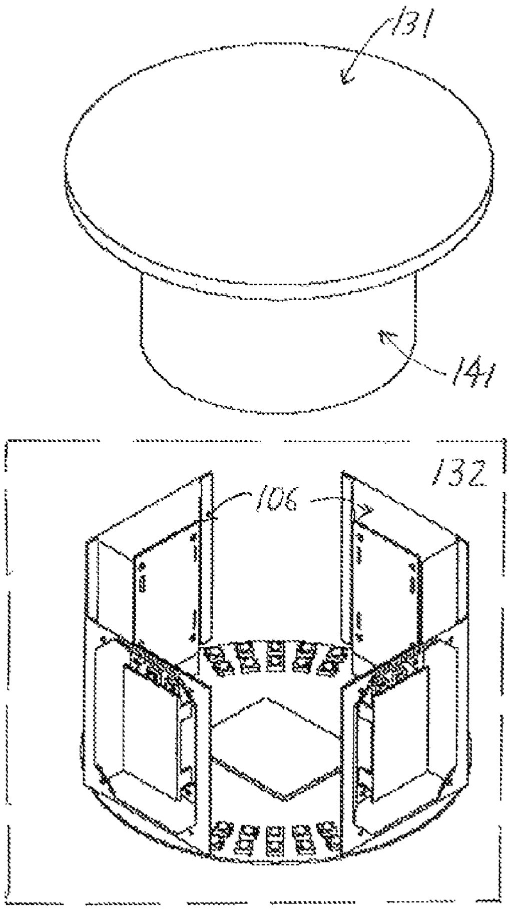

FIG. 81. Illustrates 3-D view of major components of a round-shape Combo Module assembly, with Identity Module Perimeter Lighting components installed at the round-shape Light Controller PC-board sub-assembly.

Figure elements are labeled as follows:

131—Round-shape Cover Lid, which could be designed with Perimeter Adapters (141) integrated or attached. Perimeter Adapters shape, as shown, is designed in support of Perimeter Lighting of the round-shape Identity Module assembly (132) consisting of four Illumination Light Modules (106).

Figure 82:
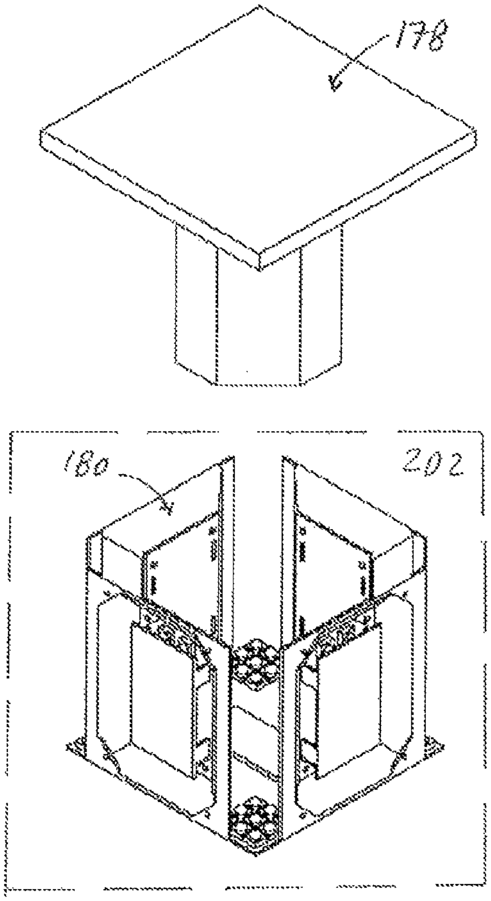

FIG. 82 Illustrates 3-D view of major components of a rectangular-shape Combo Module assembly, with Identity Module Perimeter Lighting components installed at the rectangular-shape Light Controller PC-board sub-assembly.

Figure elements are labeled as follows:

178—Rectangular-shape Cover Lid, which could be designed with Perimeter Adapters integrated or attached. Perimeter Adapters shape, as shown, is designed in support of Perimeter Lighting of the rectangular-shape Identity Module assembly (202) consisting of four Illumination Light Modules (180).

Figure 83:
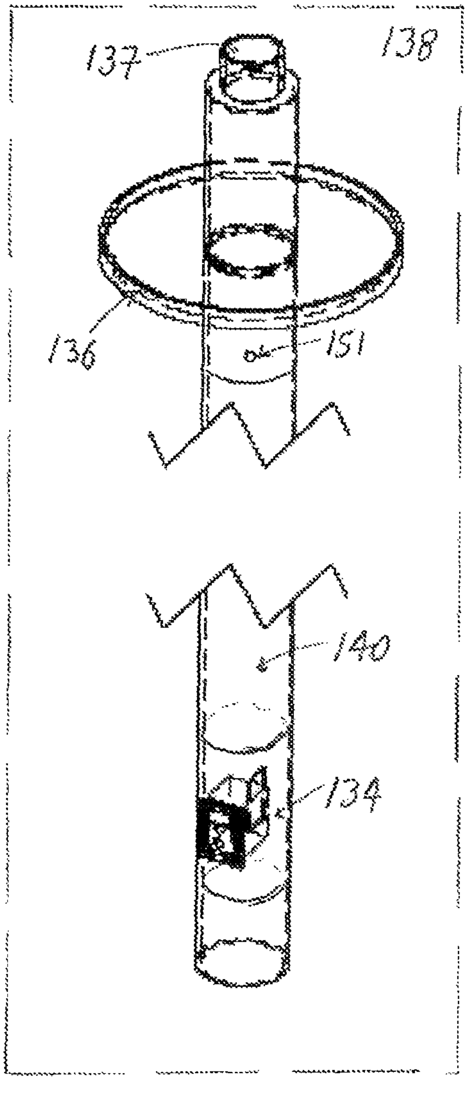

FIG. 83 Illustrates 3-D view of a Mounting Pole assembly (138), which could be designed with a round-shape Mounting Flange (136), which could be used for mechanical mounting and electrical interface of an Identification Light sub-assembly with a round-shape base. The required electrical interface wiring could be installed along the inner section of the Mounting Pole, and could be extended from the base of the Mounting Pole to the male Interface Connector (137), which could provide required power and communication interface to a Light Controller PC-board installed in an Identification Light sub-assembly on the top. As shown, a Switch Module (134) or Modules could be installed into the Mounting Pole and wired-in to provide required manual control. Also shown mounting hardware (151) for attaching Mounting Flange (136) to Mounting Pole (140)

Figure 84:
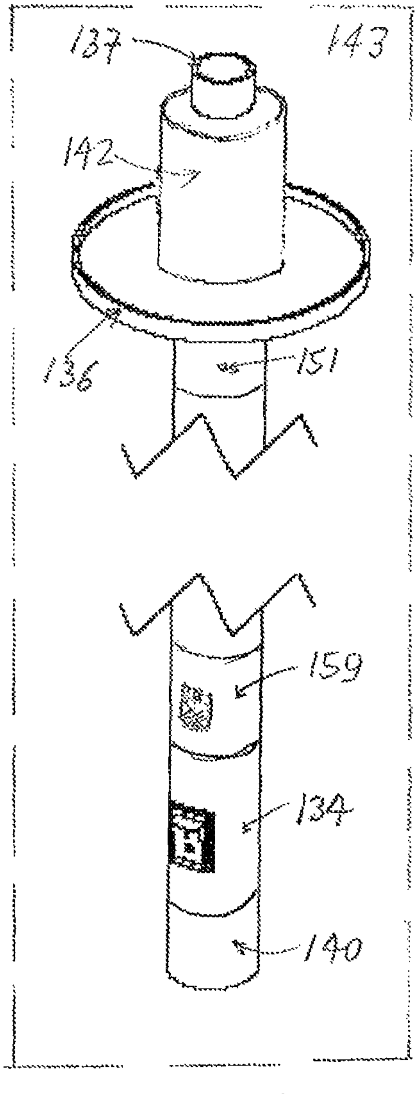

FIG. 84 Illustrates 3-D view of a Mounting Pole assembly (143), which could be designed with a round-shape Mounting Flange (142), which in addition to features listed above for Mounting Flange (136), could be designed so that its upper section could serve as one of the surfaces in support of Perimeter Lighting of a Status Module, mounted on top of it. As shown, Mounting Pole assembly could have one Switch Module (134) and one Communications Module (135) installed. Communication Module could be designed to provide convenient interface between Light Controller installed on top of the Mounting Pole and a computer or other Controller, and could support standard interface connections for hi-speed serial interfaces, such as: RS232, USB, etc.

Figure 85:
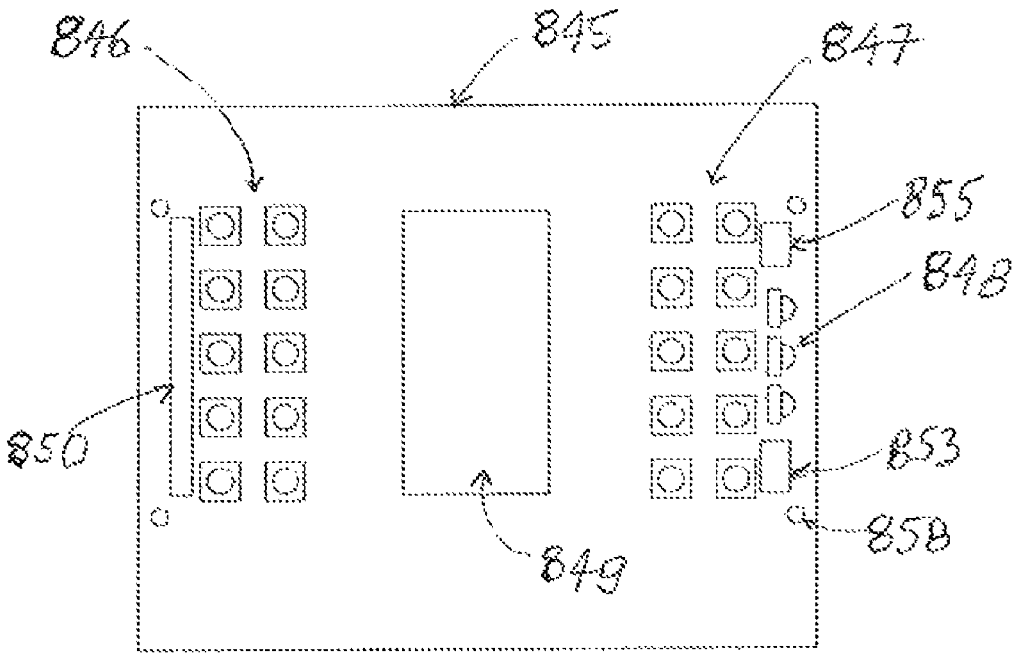

FIG. 85 Illustrates control PC-board assembly (845), which could be used in an in-line 2-section Identification Device, similar to the one shown on FIG. 59, but without optional features, such as: Solar Battery, Perimeter Lighting, etc. Location of: Illumination Devices could be selected to maximize their utilization in providing the most efficient illumination of required Designated Areas on the Front Panel, which could be placed in-front of the PC-board assembly, as part of the 2-section Identification Device design for a specific application.

Figure elements are labeled as follows:

846—Illumination Devices, which could be used for illumination of a Designated Area for the first Symbol or number on the Front Panel

847—Illumination Devices, which could be used for illumination of a Designated Area for the second Symbol or number on the Front Panel

848—LED's, which could be used for indicating Status or diagnostics

849—section of (845), which could be allocated and used for installation of power and control electronics

850—section of (845), which could be allocated and used for installation of a speaker

853—section of (835), which could be allocated and used for installation of a "remote control sensor"

855—section of (835), which could be allocated and used for installation of a "motion detector sensor"

858—one of mounting holes, which could be used to install PC-board assembly (845) inside an enclosure of a 2-section Identification Device.

Figure 86:
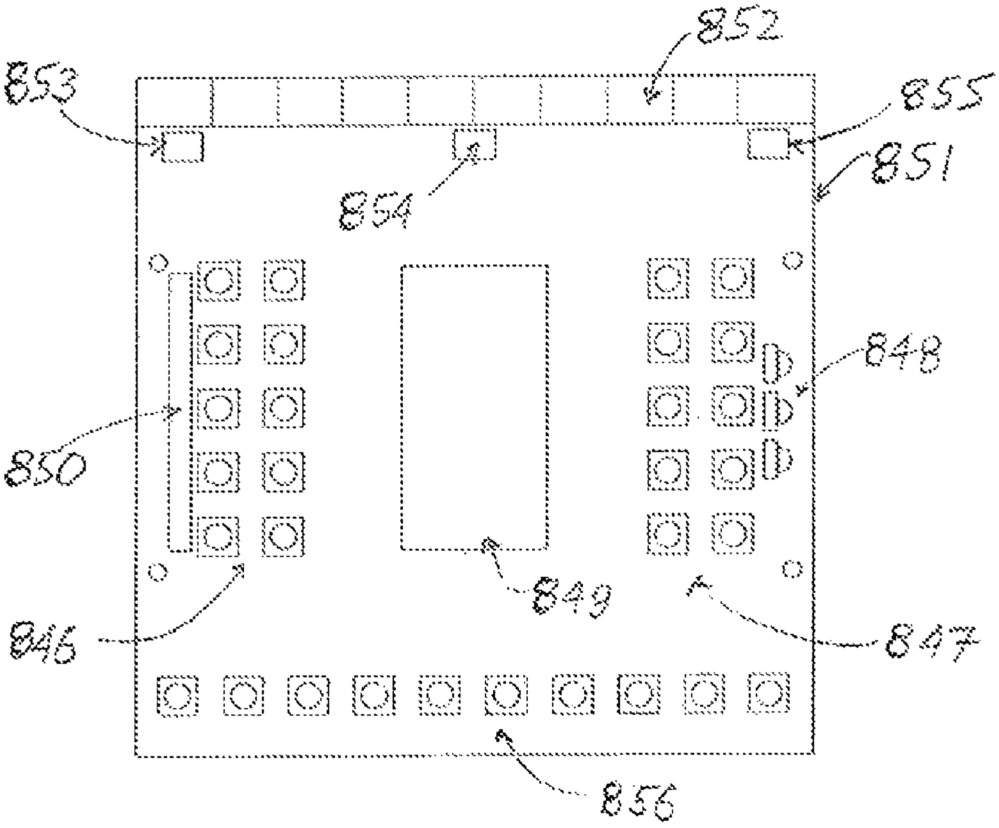

FIG. 86 Illustrates control PC-board assembly (851), which is a variation of the in-line 2-section Identification Device shown on FIG. 85, but with optional features, such as: Solar Battery (852), Perimeter Lighting (856), Light Sensor (854). Remaining elements are labeled same as on FIG. 85.

Figure 87:
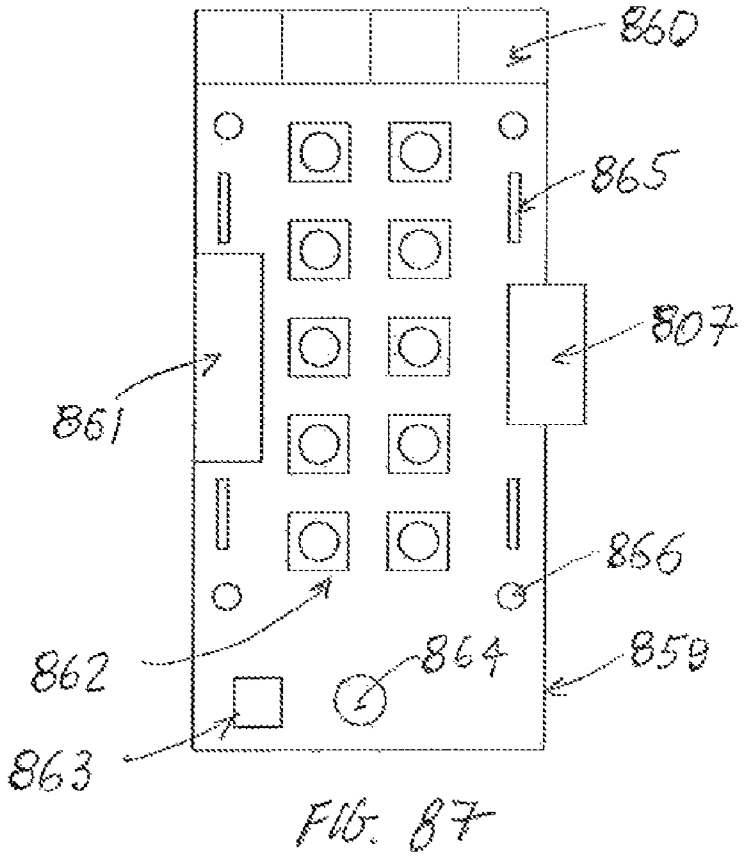

FIG. 87 Illustrates control PC-board assembly (859), which could be used for a Main Identification Module. Location of: Illumination Devices (862) could be selected to maximize their utilization in providing the most efficient illumination of required Designated Area on the Front Panel, which could be placed in-front of the PC-board assembly, as part of a Main Identification Module assembly. In this example, power and control electronics, including Controller, could be mounted on the back side of the PC-board assembly (859).

Figure elements are labeled as follows:

807—Connector, which could be used for interfacing Secondary Modules

860—section of (859), which could be allocated and used for installation of Solar Battery

861—section of (859), which could be allocated and used for installation of a speaker. Controller could use this component to play a pre-recorded audio, the content of which could be stored in a non-volatile memory of the Controller.

863—section of (859), which could be allocated and used for installation of a "motion detector sensor"

864—section of (859), which could be allocated and used for installation of an "exterior light sensor"

865—one of mounting slots, which could be used for attaching a Light Control component

Figure 88:
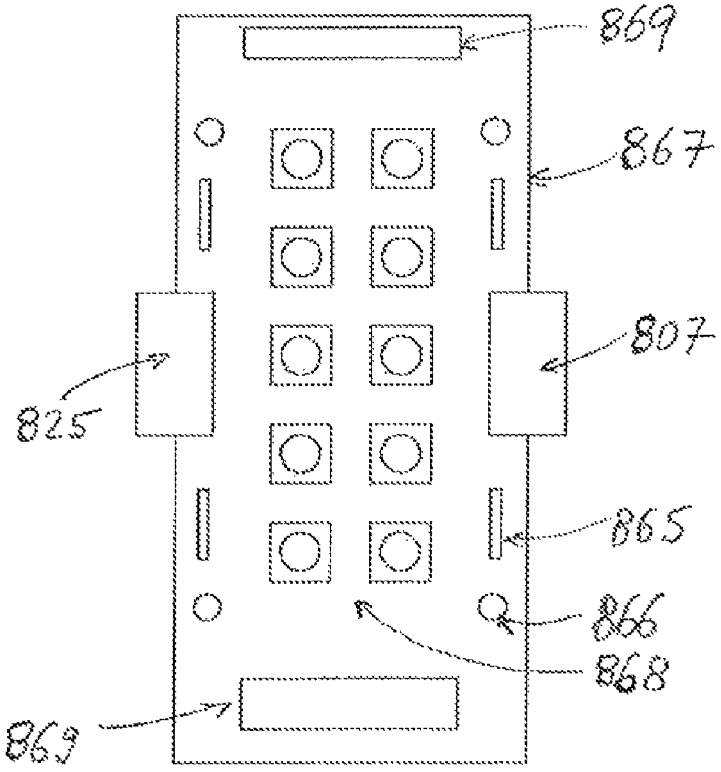

866—one of mounting holes, which could be used to install PC-board assembly (859) inside an enclosure of a Main Identification Module FIG. 88 Illustrates control PC-board assembly (867), which could be used for a Secondary Identification Module. Location of: Illumination Devices (868) could be selected to maximize their utilization in providing the most efficient illumination of required Designated Area on the Front Panel, which could be placed in-front of the PC-board assembly, as part of a Secondary Identification Module assembly.

Figure elements are labeled as follows:

807—Connector, which could be used for interfacing Secondary Modules

825—Connector, which could be used for interfacing to Main Module

869—section of (867), which could be for location of power and control electronics, as needed Remaining elements are labeled same as on FIG. 87

Figure 89:
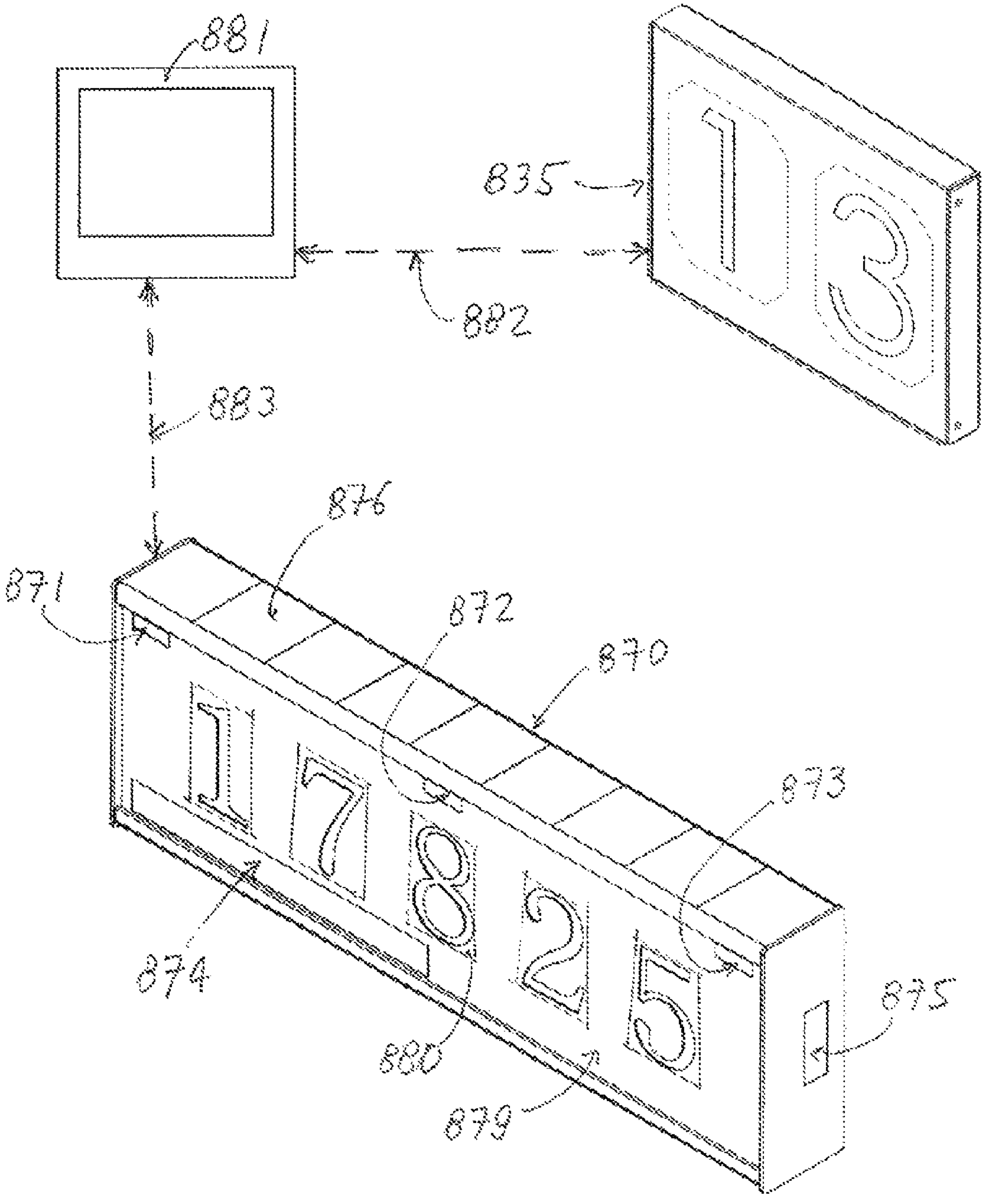

FIG. 89 illustrates Identification System, which for simplicity, as shown, could consist of:

System Controller, which could be PC; 2-number "13" Identification Device assembly (835); 5-number "17825" in-line Identification Device assembly (870); LAN wired or wireless (882), which could be used by System Controller (881) to communicate with Identification Device (834); LAN wired or wireless (883), which could be used by System Controller (881) to communicate with Identification Device (870). The 3-D view of Identification Device (870) illustrates design, which could include a number of optional features, as required for a specific application. In the example shown, the Identification Device (870) is most suitable for an outdoor installation and identification of a building, such as: residential, commercial, etc. As required, the proposed design could include standard and optional features—to meet specific requirements of practically any application. Location of: sensors, Perimeter Lighting, Status Identification, and other components—could be arranged, as needed. Controller of (870) could use sensors to detect respective conditions, which could be defined, set or pre-programmed by an user, and which, as instructed by an user, could request Controller (87)) upon detection of a specific condition or combination of conditions—to activate user-selected or user-programmed control function or functions, which could include: turning on power for Illumination Devices; turning on power for Perimeter Lighting; flashing ON-OFF Illumination Devices; playing pre-recorded audio over speaker; etc. The setting of trigger points for sensor devices, control functions associated with a condition when a trigger point or points have been detected—could be set and/or programmed by a user via wireless remote control device, which could include: hand-held device; computer, such System Controller (881); etc. As needed, respective set and/or pre-programmed control data or trigger points for each sensor, respective control functions, etc.—could be selected by a user via: wireless remote control device, and then could be stored in a non-volatile memory of the Controller of (870). Selected features described for Identification Device (870) could be employed in the design of Identification Device (835).

Figure elements are labeled as follows:

871—section of (870), which could be allocated and used for installation of a "motion detector sensor". Controller could use this sensor to detect presence of an object, which could be set or pre-programmed by an user, and which, as instructed by an user, could request Controller to activate user-selected or user-programmed control function, which could include: turning on power for Illumination Devices; play a stored audio recording over speaker (878), the content of which could be stored among other "stored audio recordings", in a non-volatile memory of the Controller.

872—section of (870), which could be allocated and used for installation of an "exterior light sensor". Controller could use this sensor to detect condition of the exterior light intensity, which could be set or pre-programmed by an user, and which, as instructed by an user, could request Controller to activate user-selected or user-programmed control function, which could include: turning on power for Illumination Devices; etc.

873—section of (870), which could be allocated and used for installation of a "remote control sensor". Controller could use this sensor to detect commands, which could be transmitted by a wireless control device, which could include: hand-held device/programmer; computer; etc.

874—section of (870), which could be allocated for any combination of: Perimeter Lighting; Status Identification; illumination of special symbols, name tag, etc.; decorative lighting; etc.

875—section of (870), which could be allocated for viewing status of diagnostic LED's, which could be located on the control PC-board inside (870)

876—section of (870), which could be allocated and used for installation of a Solar Battery

879—Front Plate which could have numbers "17825" silk-screened on top and which could be illuminated as needed

880—one of the Designated Areas which could be used for number "8" and which could be illuminated as needed

881—System Controller, which could be a PC, which could have required control program, which could be used by an user to configure and program each Identification Device connected to PC via wired or wireless LAN. The same program or another program on (881) could be used for monitoring status of each Identification Device in real-time, and then, as set by an user, to execute respective control functions per detected condition or Trigger Points of an Identification Device within the System. As needed, an user could program System Controller to execute in real-time, as needed, a local or a global command to activate specific function or set of functions on any Identification Device within the System based on detected status of any Identification Device within a System. An example—emergency condition detected by one Identification Device once detected by System Controller, could be used by System Controller to inform users at various other remote locations of that condition by executing a set of commands, which could include: turning ON or flashing respective Illumination Devices within selected number of Identification Devices connected within the System, etc.

The invention claimed is:

1. An intelligent modular display apparatus comprising;

a configurable display module comprising at least one display element consisting of at least one of a plurality of symbols, numbers, letters or graphical images;

said configurable display module further comprising an illumination component;

a programmable lighting control module;

said programmable lighting control module controlling at least one or more of the following lighting attributes including; light retaining, light diffusion and light power control;

a plurality of sensors that monitor the ambient environment, in communication with said programmable lighting control module;

said programmable lighting control module further including an intelligent control module comprising control electronics which detects features of the illumination component including at least one of light retention, light profiling and light color control and then providing electronic control signals to control said features of said illumination component;

and a user interface in connection with said programmable lighting control module that programs said programmable lighting control module.

2. The intelligent modular display apparatus of claim 1 further comprising; an illumination component that is an LED.

3. The intelligent modular display apparatus of claim 1 further comprising; wherein said user interface is connected to said programmable lighting control module via at least one of a network, wireless network, wired cable connection or the INTERNET.

4. The intelligent modular display apparatus of claim 1 further comprising; the programmable lighting control module comprises a non-volatile memory wherein trigger points for different sensor conditions are stored.

5. The intelligent modular display apparatus of claim 1 further comprising; an electronic illuminated sign located on a building or billboard which is configured and controlled by said programmable lighting control module.

6. A method of controlling an illuminated display consisting of;

programming, via a user interface, a programmable lighting control module;

configuring at least one of a plurality of symbols, numbers, letters or graphical images on said illuminated display;

controlling at least one illumination component electronically such that at least one or more of the following lighting attributes, light retaining, light diffusion and light power control of the illumination device are activated;

receiving electrical signals to said programmable lighting control module from at least one of a plurality of sensors;

determining an optimized electrical configuration of said illumination component by said programmable lighting control module based at least in part on the signals received by the plurality of sensors and further including data for light retention, light profiling and light color for an illumination component; and sending electrical control signals from said programmable lighting control module to said illumination device based upon the data from the user interface and the sensors.

7. The method of claim 6 further comprising; wherein the illumination component is an LED.

8. The method of claim 6 further comprising; wherein said user interface is connected to said programmable lighting control module via at least one of a network, wireless network, wired cable connection or the INTERNET.

9. The method of claim 6 further comprising; storing trigger points for different sensor conditions, via said user interface, in a non-volatile storage medium in the programmable lighting control module.

10. The method of claim 6 further comprising; configuring and controlling an electronic illuminated sign located on a building or billboard using said programmable lighting control module.

* * * * *